US008280998B2

(12) United States Patent
Joshi

(10) Patent No.: US 8,280,998 B2
(45) Date of Patent: *Oct. 2, 2012

(54) CONFIGURABLE GEOGRAPHIC PREFIXES FOR GLOBAL SERVER LOAD BALANCING

(75) Inventor: Prajakta S. Joshi, Cupertino, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/023,292

(22) Filed: Feb. 8, 2011

(65) Prior Publication Data

US 2011/0191459 A1    Aug. 4, 2011

Related U.S. Application Data

(63) Continuation of application No. 12/787,779, filed on May 26, 2010, now Pat. No. 7,899,899, which is a continuation of application No. 12/353,701, filed on Jan. 14, 2009, now Pat. No. 7,756,965, which is a continuation of application No. 10/840,496, filed on May 6, 2004, now Pat. No. 7,496,651.

(51) Int. Cl.
*G06F 15/173* (2006.01)
(52) U.S. Cl. ......... 709/223; 709/217; 709/224; 718/105
(58) Field of Classification Search .................. 709/203, 709/217, 219, 223, 225, 226, 237, 239, 245; 370/352, 401; 718/105
See application file for complete search history.

(56) References Cited

U.S. PATENT DOCUMENTS

| | | | |
|---|---|---|---|
| 5,031,094 A | 7/1991 | Toegel et al. | |
| 5,359,593 A | 10/1994 | Derby et al. | |
| 5,867,706 A | 2/1999 | Martin et al. | |
| 5,918,017 A | 6/1999 | Attanasio et al. | |
| 5,948,061 A | 9/1999 | Merriman et al. | |
| 5,951,634 A | 9/1999 | Sitbon et al. | |
| 6,006,269 A | 12/1999 | Phaal | |
| 6,006,333 A | 12/1999 | Nielsen | |
| 6,078,956 A | 6/2000 | Bryant et al. | |
| 6,092,178 A | 7/2000 | Jindal et al. | |

(Continued)

FOREIGN PATENT DOCUMENTS

EP    1128613    8/2001

(Continued)

OTHER PUBLICATIONS

Joshi et al., U.S. Appl. No. 11/429,177, filed May 5, 2006.

(Continued)

*Primary Examiner* — Lashonda T Jacobs
(74) *Attorney, Agent, or Firm* — Graybeal Jackson LLP

(57) ABSTRACT

In a load balancing system, user-configurable geographic prefixes are provided. IP address prefix allocations provided by the Internet Assigned Numbers Authority (IANA) and associated geographic locations are stored in a first, static database in a load balancing switch, along with other possible default geographic location settings. A second, non-static database stores user-configured geographic settings. In particular, the second database stores Internet Protocol (IP) address prefixes and user-specified geographic regions for those prefixes. The specified geographic region can be continent, country, state, city, or other user-defined region. The geographic settings in the second database can override the information in the first database. These geographic entries help determine the geographic location of a client and host IP addresses, and aid in directing the client to a host server that is geographically the closest to that client.

15 Claims, 7 Drawing Sheets

U.S. PATENT DOCUMENTS

| | | | |
|---|---|---|---|
| 6,112,239 A | 8/2000 | Kenner et al. | |
| 6,115,752 A | 9/2000 | Chauhan | |
| 6,119,143 A | 9/2000 | Dias et al. | |
| 6,128,279 A | 10/2000 | O'Neil et al. | |
| 6,128,642 A | 10/2000 | Doraswamy et al. | |
| 6,148,410 A | 11/2000 | Baskey et al. | |
| 6,157,649 A | 12/2000 | Peirce et al. | |
| 6,167,445 A | 12/2000 | Gai et al. | |
| 6,167,446 A | 12/2000 | Lister et al. | |
| 6,178,160 B1 | 1/2001 | Bolton et al. | |
| 6,182,139 B1 | 1/2001 | Brendel | |
| 6,185,619 B1 | 2/2001 | Joffe et al. | |
| 6,195,691 B1 | 2/2001 | Brown | |
| 6,205,477 B1 | 3/2001 | Johnson et al. | |
| 6,233,604 B1 | 5/2001 | Van Horne et al. | |
| 6,260,070 B1 | 7/2001 | Shah | |
| 6,262,976 B1 | 7/2001 | McNamara | |
| 6,286,039 B1 | 9/2001 | Van Horne et al. | |
| 6,286,047 B1 | 9/2001 | Ramanathan et al. | |
| 6,304,913 B1 | 10/2001 | Rune | |
| 6,317,775 B1 | 11/2001 | Coile et al. | |
| 6,324,177 B1 | 11/2001 | Howes et al. | |
| 6,324,580 B1 | 11/2001 | Jindal et al. | |
| 6,327,622 B1 | 12/2001 | Jindal et al. | |
| 6,336,137 B1 | 1/2002 | Lee et al. | |
| 6,381,627 B1 | 4/2002 | Kwan et al. | |
| 6,389,462 B1 | 5/2002 | Cohen et al. | |
| 6,393,473 B1 | 5/2002 | Chu | |
| 6,405,252 B1 | 6/2002 | Gupta et al. | |
| 6,411,998 B1 | 6/2002 | Bryant et al. | |
| 6,427,170 B1 | 7/2002 | Sitaraman et al. | |
| 6,434,118 B1 | 8/2002 | Kirschenbaum | |
| 6,438,652 B1 | 8/2002 | Jordan et al. | |
| 6,446,121 B1 | 9/2002 | Shah et al. | |
| 6,449,657 B2 | 9/2002 | Stanbach, Jr. et al. | |
| 6,470,389 B1 | 10/2002 | Chung et al. | |
| 6,473,802 B2 | 10/2002 | Masters | |
| 6,480,508 B1 | 11/2002 | Mwikalo et al. | |
| 6,487,555 B1 | 11/2002 | Bharat et al. | |
| 6,490,624 B1 | 12/2002 | Sampson et al. | |
| 6,513,061 B1 | 1/2003 | Ebata et al. | |
| 6,542,964 B1 | 4/2003 | Scharber | |
| 6,549,944 B1 | 4/2003 | Weinberg et al. | |
| 6,578,066 B1* | 6/2003 | Logan et al. | 718/105 |
| 6,578,077 B1 | 6/2003 | Rakoshitz et al. | |
| 6,601,084 B1 | 7/2003 | Bhaskaran et al. | |
| 6,606,643 B1 | 8/2003 | Emens et al. | |
| 6,611,861 B1 | 8/2003 | Schairer et al. | |
| 6,647,009 B1 | 11/2003 | Kubota et al. | |
| 6,665,702 B1 | 12/2003 | Zisapel et al. | |
| 6,681,232 B1 | 1/2004 | Sistanizadeh et al. | |
| 6,681,323 B1 | 1/2004 | Fontanesi et al. | |
| 6,684,250 B2 | 1/2004 | Anderson et al. | |
| 6,691,165 B1 | 2/2004 | Bruck et al. | |
| 6,725,253 B1 | 4/2004 | Okano et al. | |
| 6,745,241 B1 | 6/2004 | French et al. | |
| 6,748,416 B2 | 6/2004 | Carpenter et al. | |
| 6,754,699 B2 | 6/2004 | Swildens et al. | |
| 6,760,775 B1 | 7/2004 | Anerousis | |
| 6,772,211 B2 | 8/2004 | Lu et al. | |
| 6,779,017 B1 | 8/2004 | Lamberton et al. | |
| 6,785,704 B1 | 8/2004 | McCanne | |
| 6,789,125 B1 | 9/2004 | Aviani et al. | |
| 6,795,434 B1 | 9/2004 | Kumar et al. | |
| 6,795,858 B1 | 9/2004 | Jain et al. | |
| 6,795,860 B1 | 9/2004 | Shah | |
| 6,801,949 B1 | 10/2004 | Bruck et al. | |
| 6,810,411 B1 | 10/2004 | Coughlin et al. | |
| 6,826,198 B2 | 11/2004 | Turina et al. | |
| 6,839,700 B2 | 1/2005 | Doyle et al. | |
| 6,850,984 B1 | 2/2005 | Kalkunte et al. | |
| 6,862,627 B1 | 3/2005 | Cheshire | |
| 6,874,152 B2 | 3/2005 | Vermeire et al. | |
| 6,879,995 B1 | 4/2005 | Chinta et al. | |
| 6,880,000 B1 | 4/2005 | Tominaga et al. | |
| 6,883,028 B1 | 4/2005 | Johnson et al. | |
| 6,898,633 B1 | 5/2005 | Lyndersay et al. | |
| 6,901,081 B1 | 5/2005 | Ludwig | |
| 6,920,498 B1 | 7/2005 | Gourlay | |
| 6,928,485 B1* | 8/2005 | Krishnamurthy et al. | 709/242 |
| 6,950,848 B1 | 9/2005 | Yousefi'zadeh | |
| 6,963,914 B1 | 11/2005 | Breitbart et al. | |
| 6,963,917 B1 | 11/2005 | Callis et al. | |
| 6,985,956 B2 | 1/2006 | Luke et al. | |
| 6,987,763 B2 | 1/2006 | Rochberger et al. | |
| 6,996,615 B1 | 2/2006 | McGuire | |
| 6,996,616 B1 | 2/2006 | Leighton et al. | |
| 7,000,007 B1 | 2/2006 | Valenti | |
| 7,020,698 B2 | 3/2006 | Andrews et al. | |
| 7,020,714 B2 | 3/2006 | Kalyanaraman et al. | |
| 7,028,083 B2* | 4/2006 | Levine et al. | 709/223 |
| 7,032,010 B1 | 4/2006 | Swildens et al. | |
| 7,032,031 B2 | 4/2006 | Jungck et al. | |
| 7,036,039 B2 | 4/2006 | Holland | |
| 7,047,300 B1 | 5/2006 | Oehrke et al. | |
| 7,058,706 B1 | 6/2006 | Iyer | |
| 7,058,717 B2 | 6/2006 | Chao et al. | |
| 7,062,562 B1 | 6/2006 | Baker et al. | |
| 7,062,642 B1 | 6/2006 | Langrind et al. | |
| 7,080,138 B1 | 7/2006 | Baker et al. | |
| 7,082,102 B1 | 7/2006 | Wright | |
| 7,086,061 B1 | 8/2006 | Joshi et al. | |
| 7,089,293 B2 | 8/2006 | Grosner et al. | |
| 7,099,915 B1 | 8/2006 | Tenereillo et al. | |
| 7,114,008 B2 | 9/2006 | Jungck et al. | |
| 7,117,269 B2 | 10/2006 | Lu et al. | |
| 7,117,530 B1 | 10/2006 | Lin | |
| 7,124,188 B2 | 10/2006 | Mangipudi et al. | |
| 7,127,713 B2 | 10/2006 | Davis et al. | |
| 7,136,932 B1 | 11/2006 | Schneider et al. | |
| 7,139,242 B2 | 11/2006 | Bays | |
| 7,177,933 B2* | 2/2007 | Foth | 709/226 |
| 7,185,052 B2 | 2/2007 | Day | |
| 7,197,547 B1 | 3/2007 | Miller et al. | |
| 7,206,806 B2 | 4/2007 | Pineau | |
| 7,213,068 B1 | 5/2007 | Kohli et al. | |
| 7,225,272 B2 | 5/2007 | Kelley et al. | |
| 7,240,015 B1 | 7/2007 | Karmouch et al. | |
| 7,240,100 B1 | 7/2007 | Wein et al. | |
| 7,254,626 B1 | 8/2007 | Kommula et al. | |
| 7,257,642 B1 | 8/2007 | Bridger et al. | |
| 7,260,645 B2 | 8/2007 | Bays | |
| 7,277,954 B1 | 10/2007 | Stewart et al. | |
| 7,289,519 B1 | 10/2007 | Liskov | |
| 7,296,088 B1* | 11/2007 | Padmanabhan et al. | 709/238 |
| 7,321,926 B1 | 1/2008 | Zhang et al. | |
| 7,330,908 B2 | 2/2008 | Jungck | |
| 7,383,288 B2 | 6/2008 | Miloushev et al. | |
| 7,423,977 B1 | 9/2008 | Joshi et al. | |
| 7,441,045 B2 | 10/2008 | Skene et al. | |
| 7,454,500 B1 | 11/2008 | Hsu et al. | |
| 7,478,148 B2 | 1/2009 | Neerdaels | |
| 7,496,651 B1* | 2/2009 | Joshi | 709/223 |
| 7,523,181 B2 | 4/2009 | Swildens et al. | |
| 7,573,886 B1 | 8/2009 | Ono | |
| 7,574,508 B1 | 8/2009 | Kommula | |
| 7,581,006 B1 | 8/2009 | Lara et al. | |
| 7,581,009 B1 | 8/2009 | Hsu et al. | |
| 7,584,262 B1 | 9/2009 | Wang et al. | |
| 7,584,301 B1 | 9/2009 | Joshi | |
| 7,653,700 B1 | 1/2010 | Bahl et al. | |
| 7,657,629 B1 | 2/2010 | Kommula | |
| 7,676,576 B1 | 3/2010 | Kommula | |
| 7,756,965 B2* | 7/2010 | Joshi | 709/223 |
| 7,840,678 B2 | 11/2010 | Joshi | |
| 7,860,964 B2 | 12/2010 | Brady et al. | |
| 7,885,188 B2 | 2/2011 | Joshi | |
| 7,899,899 B2* | 3/2011 | Joshi | 709/223 |
| 7,925,713 B1 | 4/2011 | Day et al. | |
| 7,949,757 B2 | 5/2011 | Joshi | |
| 8,024,441 B2 | 9/2011 | Kommula et al. | |
| 2001/0049741 A1 | 12/2001 | Skene et al. | |
| 2001/0052016 A1* | 12/2001 | Skene et al. | 709/226 |
| 2002/0026551 A1 | 2/2002 | Kamimaki et al. | |
| 2002/0038360 A1 | 3/2002 | Andrews et al. | |
| 2002/0055939 A1 | 5/2002 | Nardone et al. | |
| 2002/0059170 A1 | 5/2002 | Vange | |

| | | |
|---|---|---|
| 2002/0059464 A1 | 5/2002 | Hata et al. |
| 2002/0062372 A1 | 5/2002 | Hong et al. |
| 2002/0078233 A1 | 6/2002 | Biliris et al. |
| 2002/0087722 A1 | 7/2002 | Datta et al. |
| 2002/0091840 A1 | 7/2002 | Pulier et al. |
| 2002/0112036 A1 | 8/2002 | Bohannon et al. |
| 2002/0120743 A1 | 8/2002 | Shabtay et al. |
| 2002/0120763 A1 | 8/2002 | Miloushev et al. |
| 2002/0124096 A1 | 9/2002 | Loguinov et al. |
| 2002/0133601 A1 | 9/2002 | Kennamer et al. |
| 2002/0150048 A1 | 10/2002 | Ha et al. |
| 2002/0154600 A1 | 10/2002 | Ido et al. |
| 2002/0188862 A1 | 12/2002 | Trethewey et al. |
| 2002/0194324 A1 | 12/2002 | Guha |
| 2002/0194335 A1 | 12/2002 | Maynard |
| 2003/0018796 A1 | 1/2003 | Chou et al. |
| 2003/0031185 A1 | 2/2003 | Kikuchi et al. |
| 2003/0035430 A1 | 2/2003 | Islam et al. |
| 2003/0065711 A1 | 4/2003 | Acharya et al. |
| 2003/0065762 A1 | 4/2003 | Stolorz et al. |
| 2003/0065763 A1 | 4/2003 | Swildens et al. |
| 2003/0105797 A1 | 6/2003 | Dolev et al. |
| 2003/0115283 A1 | 6/2003 | Barbir et al. |
| 2003/0135509 A1 | 7/2003 | Davis et al. |
| 2003/0154239 A1 | 8/2003 | Davis et al. |
| 2003/0210686 A1 | 11/2003 | Terrell et al. |
| 2003/0210694 A1 | 11/2003 | Jayaraman et al. |
| 2003/0229697 A1 | 12/2003 | Borella |
| 2004/0019680 A1 | 1/2004 | Chao et al. |
| 2004/0024872 A1 | 2/2004 | Kelley et al. |
| 2004/0039798 A1 | 2/2004 | Hotz et al. |
| 2004/0039847 A1 | 2/2004 | Persson et al. |
| 2004/0064577 A1 | 4/2004 | Dahlin et al. |
| 2004/0194102 A1 | 9/2004 | Neerdaels |
| 2004/0249939 A1* | 12/2004 | Amini et al. .................. 709/225 |
| 2004/0249971 A1 | 12/2004 | Klinker |
| 2004/0259565 A1 | 12/2004 | Lucidarme |
| 2005/0002410 A1 | 1/2005 | Chao et al. |
| 2005/0021883 A1 | 1/2005 | Shishizuka et al. |
| 2005/0033858 A1 | 2/2005 | Swildens et al. |
| 2005/0086295 A1 | 4/2005 | Cunningham et al. |
| 2005/0149531 A1 | 7/2005 | Srivastava |
| 2005/0169180 A1 | 8/2005 | Ludwig |
| 2005/0286416 A1 | 12/2005 | Shimonishi et al. |
| 2006/0020715 A1 | 1/2006 | Jungck |
| 2006/0036743 A1 | 2/2006 | Deng et al. |
| 2006/0167894 A1 | 7/2006 | Wunner |
| 2006/0209689 A1 | 9/2006 | Nakano et al. |
| 2007/0168448 A1 | 7/2007 | Garbow et al. |
| 2007/0168547 A1 | 7/2007 | Krywaniuk |
| 2007/0180113 A1 | 8/2007 | Van Bemmel |
| 2007/0208877 A1 | 9/2007 | Kelley et al. |
| 2008/0016233 A1 | 1/2008 | Schneider |
| 2008/0037420 A1 | 2/2008 | Tang |
| 2008/0123597 A1 | 5/2008 | Arbol et al. |
| 2008/0144784 A1 | 6/2008 | Limberg |
| 2008/0147866 A1 | 6/2008 | Stolorz et al. |
| 2010/0010991 A1 | 1/2010 | Joshi |
| 2010/0011120 A1 | 1/2010 | Kommula |
| 2010/0011126 A1 | 1/2010 | Hsu et al. |
| 2010/0061236 A1 | 3/2010 | Joshi |
| 2010/0082787 A1 | 4/2010 | Kommula et al. |
| 2010/0095008 A1 | 4/2010 | Joshi |
| 2010/0115133 A1 | 5/2010 | Joshi |
| 2010/0121932 A1 | 5/2010 | Joshi et al. |
| 2010/0153558 A1 | 6/2010 | Kommula |
| 2010/0223621 A1 | 9/2010 | Joshi |
| 2010/0293296 A1 | 11/2010 | Hsu et al. |
| 2010/0299427 A1 | 11/2010 | Joshi |
| 2011/0099261 A1 | 4/2011 | Joshi |
| 2011/0122771 A1 | 5/2011 | Joshi |
| 2011/0264798 A1 | 10/2011 | Joshi |
| 2012/0096166 A1 | 4/2012 | Devarapalli et al. |

FOREIGN PATENT DOCUMENTS

| | | |
|---|---|---|
| WO | 01/039003 | 5/2001 |
| WO | 01/093530 | 12/2001 |

OTHER PUBLICATIONS

Hsu et al., U.S. Appl. No. 12/272,618, filed Nov. 17, 2008.

Albitz, P., et al., "DNS and BIND in a Nutshell," O'Reilly & Associates, Sebastopol, CA, 1992, pp. 214-215.

Alteon Systems, "Alteon WebSystems Introduces New Layer 4+ Switching Technology that Speeds User Access to Internet Servers," Dec. 7, 1998.

Alteon WebSystems, Inc., "Enhancing Web User Experience with Global Server Load Balancing," Jun. 1999, 8 pages.

Krapf, E., "Alteon's Global Server Load Balancing," Business Communications Review, Jan. 1999, p. 60.

Nortel Networks, "Alteon Personal Content Director," © 2001, can be retrieved from http://www.nortelnetworks.com/personalinternet, 4 pages.

IBM Corp., IBM WebSphere Performance Pack: Load Balancing with IBM SecureWay Network Dispatcher, First Edition, Chapters 1, 2, 4, and 8, Oct. 1999.

IBM Corp., SecureWay® Network Dispatcher: User's Guide—Version 2.1 for AIX, Solaris, and Windows NT, Third Edition, Chapters 3, 4, 9, 10, 11, and Appendices C & E, Mar. 1999.

Yerxa, G., "ACElerate on Fast Track for Load-Balancing," Mar. 8, 1999, retrieved Nov. 5, 2002, from http://www.networkcomputing.com/1005/1005sp2.html, pp. 1-4.

Bestavros, Azer, "WWW Traffic Reduction and Load Balancing through Server-Based Caching," IEEE Concurrency, Jan.-Mar., 1997, pp. 56-67.

Paul, Arindam et al., "Balancing Web Server Load for Adaptable Video Distribution," IEEE, 2000, pp. 469-476.

AlteonWebSystems, "PCD White Paper," AlteonWebSystems, pp. 1-8, Mar. 2001.

Cardellini, V., et al., "Dynamic Load Balancing on Web-server Systems," IEEE Internet Computing, 3(3):28-39, May-Jun. 1999.

Foundry Networks, Inc., "Server Load Balancing in Today's Web-enabled Enterprises," White Paper, pp. 1-10, Apr. 2002.

Genova, Z., et al., "Challenges in URL Switching for Implementing Globally Distributed Web Sites," IEEE, pp. 89-94, 2000.

Genova, Z., et al., "Challenges to URL Switching for Implementing Globally Distributed Web Sites," Department of Computer Science and Engineering, University of South Florida, pp. 1-9, Aug. 11, 2000.

Venkataramani, A., et al., "TCP Nice: A Mechanism for Background Transfer," Proceedings of the Fifth Symposium on Operating Systems Design and Implementation (OSDI'02), ISBN:1-931971-06-4, 329-343, 2002.

Doeringer et al., "Routing on Longest-Matching Prefixes," IEEE/ACM Transactions on Networking, vol. 4, No. 1, Feb. 1996, pp. 86-97.

Non-Final Office Action for U.S. Appl. No. 09/670,487, Mailed Dec. 31, 2003, 24 pages.

Final Office Action for U.S. Appl. No. 09/670,487, Mailed Sep. 21, 2004, 22 pages.

Non-Final Office Action for U.S. Appl. No. 09/670,487, Mailed Mar. 15, 2005, 18 pages.

Final Office Action for U.S. Appl. No. 09/670,487, Mailed Nov. 3, 2005, 18 pages.

Non-Final Office Action for U.S. Appl. No. 09/670,487, Mailed May 3, 2006, 21 pages.

Non-Final Office Action for U.S. Appl. No. 09/670,487, Mailed Nov. 17, 2006, 11 pages.

Final Office Action for U.S. Appl. No. 09/670,487, Mailed Oct. 30, 2007, 14 pages.

Non-Final Office Action for U.S. Appl. No. 09/670,487, Mailed Jul. 22, 2008, 11 pages.

Notice of Allowance for U.S. Appl. No. 09/670,487, Mailed Sep. 18, 2008, 7 pages.

Non-Final Office Action for U.S. Appl. No. 11/741,480, Mailed Nov. 27, 2007, 12 pages.

Non-Final Office Action for U.S. Appl. No. 11/741,480, Mailed Apr. 29, 2008, 10 pages.

Final Office Action for U.S. Appl. No. 11/741,480, Mailed Oct. 31, 2008, 15 pages.

Notice of Allowance for U.S. Appl. No. 11/741,480, Mailed Apr. 10, 2009, 7 pages.

Non-Final Office Action for U.S. Appl. No. 10/211,822, Mailed Aug. 19, 2005, 16 pages.
Notice of Allowance for U.S. Appl. No. 10/211,822, Mailed Mar. 7, 2006, 8 pages.
Non-Final Office Action for U.S. Appl. No. 10/377,364, mailed on Sep. 22, 2006, 18 pages.
Non-Final Office Action for U.S. Appl. No. 10/377,364, mailed on Mar. 26, 2007, 14 pages.
Non-Final Office Action for U.S. Appl. No. 10/377,364, mailed on Sep. 4, 2007, 13 pages.
Final Office Action for U.S. Appl. No. 10/377,364, mailed on Apr. 9, 2008, 15 pages.
Non-Final Office Action for U.S. Appl. No. 10/377,364, mailed on Nov. 24, 2008, 19 pages.
Final Office Action for U.S. Appl. No. 10/377,364, mailed on Aug. 31, 2009, 25 pages.
Advisory Action for U.S. Appl. No. 10/377,364, mailed on Nov. 23, 2009, 3 pages.
Notice of Allowance for U.S. Appl. No. 10/377,364, mailed on Jan. 12, 2010, 5 pages.
Non-Final Office Action for U.S. Appl. No. 10/206,580, Mailed Aug. 15, 2005, 14 pages.
Final Office Action for U.S. Appl. No. 10/206,580, Mailed Mar. 9, 2006, 12 pages.
Advisory Action for U.S. Appl. No. 10/206,580, Mailed Jun. 6, 2006, 3 pages.
Non-Final Office Action for U.S. Appl. No. 10/206,580, Mailed Jul. 12, 2006, 12 pages.
Notice of Allowance for U.S. Appl. No. 10/206,580, Mailed Jan. 11, 2007, 17 pages.
Non-Final Office Action for U.S. Appl. No. 10/376,903, mailed on Jul. 17, 2006, 7 pages.
Final Office Action for U.S. Appl. No. 10/376,903, mailed on Jan. 12, 2007, 8 pages.
Non-Final Office Action for U.S. Appl. No. 10/376,903, mailed on Jun. 5, 2007, 13 pages.
Non-Final Office Action for U.S. Appl. No. 10/376,903, mailed on Feb. 20, 2008, 10 pages.
Final Office Action for U.S. Appl. No. 10/376,903, mailed on Oct. 16, 2008.
Non-Final Office Action for U.S. Appl. No. 10/376,903, mailed on Mar. 4, 2009, 8 pages.
Non-Final Office Action for U.S. Appl. No. 11/707,697, Mailed Mar. 3, 2009, 41 pages.
Requirement for Restriction/Election for U.S. Appl. No. 11/707,697, mailed on Sep. 17, 2009, 6 pages.
Final Office Action for U.S. Appl. No. 11/707,697, mailed on Jan. 12, 2010, 22 pages.
Non-Final Office Action for U.S. Appl. No. 10/214,921, mailed on Feb. 7, 2006, 7 pages.
Final Office Action for U.S. Appl. No. 10/214,921, mailed on Aug. 9, 2006, pp. 10 pages.
Advisory Action for U.S. Application No. 10/214,921, mailed on Sep. 21, 2006, 3 pages.
Non-Final Office Action for U.S. Appl. No. 10/214,921, mailed on Dec. 7, 2006, 11 pages.
Final Office Action for U.S. Appl. No. 10/214,921, mailed on Aug. 13, 2007, 20 pages.
Non-Final Office Action for U.S. Appl. No. 10/214,921, mailed on Nov. 15, 2007, 23 pages.
Final Office Action for U.S. Appl. No. 10/214,921, mailed on Jun. 12, 2008, 21 pages.
Non-Final Office Action for U.S. Appl. No. 10/214,921, mailed on Oct. 6, 2008, 33 pages.
Notice of Allowance for U.S. Appl. No. 10/214,921, mailed on Apr. 3, 2009, 10 pages.
Non-Final Office Action for U.S. Appl. No. 10/305,823, Mailed Jan. 12, 2006, 16 pages.
Final Office Action for U.S. Appl. No. 10/305,823, mailed on Jul. 3, 2006, 13 pages.
Non-Final Office Action for U.S. Appl. No. 10/305,823, mailed on Jan. 3, 2007, 13 pages.
Non-Final Office Action for U.S. Appl. No. 10/305,823, mailed on Sep. 10, 2007, 17 pages.
Final Office Action for U.S. Appl. No. 10/305,823, mailed on Mar. 24, 2008, 18 pages.
Advisory Action for U.S. Appl. No. 10/305, 823, mailed on Jul. 9, 2008, 4 pages.
Examiner's Response to Appeal Brief for U.S. Appl. No. 10/305,823, mailed on Mar. 4, 2009, 26 pages.
Office Communication Regarding Prior Art Relied Upon in the Rejection of Claims Under Appeal, for U.S. Appl. No. 10/305,823, mailed on Apr. 13, 2009 2 pages.
Non-Final Office Action for U.S. Appl. No. 10/674,627, mailed on Jun. 5, 2006.
Final Office Action for U.S. Appl. No. 10/674,627, mailed on Nov. 3, 2006, 16 pages.
Non-Final Office Action for U.S. Appl. No. 10/674,627, mailed on Jul. 30, 2007, 9 pages.
Final Office Action for U.S. Appl. No. 10/674,627, mailed on Apr. 11, 2008, 17 pages.
Non-Final Office Action for U.S. Appl. No. 10/674,627, mailed on Dec. 23, 2008, 18 pages.
Final Office Action for U.S. Appl. No. 10/674,627, mailed on Aug. 3, 2009, 17 pages.
Advisory Action for U.S. Appl. No. 10/674,627, mailed on Oct. 16, 2009, 3 pages.
Notice of Allowance for U.S. Appl. No. 10/839,919, mailed on Mar. 5, 2008, 17 pages.
Non-Final Office Action for U.S. Appl. No. 10/839,919, mailed on Jun. 18, 2008, 15 pages.
Final Office Action for U.S. Appl. No. 10/839,919, mailed on Dec. 9, 2008, 22 pages.
Notice of Allowance for U.S. Appl. No. 10/839,919, mailed on May 14, 2009, 19 pages.
Non-Final Office Action for U.S. Appl. No. 10/840,496, mailed on Oct. 18, 2007, 22 pages.
Final Office Action for U.S. Appl. No. 10/840,496, mailed on Aug. 1, 2008, 13 pages.
Notice of Allowance for U.S. Appl. No. 10/840,496, mailed on Oct. 15, 2008, 6 pages.
Non-Final Office Action for U.S. Appl. No. 10/924,552, Mailed Feb. 27, 2008, 30 pages.
Notice of Allowance for U.S. Appl. No. 10/924,552, Mailed May 30, 2008, 20 pages.
Cisco Document, "Configuring the CSS Domain Name Service," posted on Dec. 2000, Cisco Systems Inc., http://www.ciscosystems.com, pp. 1-13.
Office Action for Reexamination Control No. 90/011,763, mailed Oct. 4, 2011, 7 pages.
Ex Parte Reexamination Interview Summary for Reexamination Control No. 90/011,763, mailed on Nov. 29, 2011, 57 pages.
Request for Inter Partes Reexamination for U.S. Patent No. 7,840,678, mailed on Nov. 17, 2011, 164 pages.
Order Granting Request for Inter Partes Reexamination of U.S. Patent No. 7,840,678 and Office Action for Reexamination Control No. 95/001,822, mailed Jan. 12, 2012, 21 pages.
Notice of Allowance for U.S. Appl. No. 12/938,232, mailed on Apr. 7, 2011, 51 pages.
Non-Final Office Action for U.S. Appl. No. 13/101,398, mailed on Nov. 10, 2011, 58 pages.
Request for Reexamination of U.S. Patent No. 7,756,965, filed Jun. 27, 2011, 38 pages.
Order Granting Request for Reexamination of U.S. Patent No. 7,756,965, mailed Aug. 19, 2011, Reexamination Control No. 90/011,761, 9 pages.
Office Action for Reexamination Control No. 90/011,761, mailed Nov. 18, 2011, 12 pages.
Request for Inter Partes Reexamination for U.S. Patent No. 7,756,965 Bl, filed Nov. 18, 2011, 189 pages.
Request for Reexamination of U.S. Patent No. 7,899,899, filed Jun. 27, 2011, 24 pages.
Order Granting Request for Reexamination of U.S. Patent No. 7,899,899, mailed Aug. 19, 2011, Reexamination Control No. 90/011,760, 9 pages.

Office Action for Reexamination Control No. 90/011,760, mailed Nov. 18, 2011, 8 pages.

Request for Inter Partes Reexamination for U.S. Patent No. 7,899,899 B1, filed Nov. 18, 2011, 153 pages.

Network Working Group, Request for Comments (RFC) 4033, "DNS Security Introduction and Requirements," Mar. 2005, 22 pages.

Network Working Group, Request for Comments (RFC) 4034, "Resource Records for the DNS Security Extensions," Mar. 2005, 31 pages.

Network Working Group, Request for Comments (RFC) 4035, "Protocol Modifications for the DNS Security Extensions," Mar. 2005, 55 pages.

National Institute of Standards and Technology (NIST), "Secure Domain Name System (DNS) Deployment Guide," Special Publication 800-81, May 2006, 103 pages.

CMP Media LLC, "VeriSign DNSSEC Interop Lab Adds Brocade, A10 Networks, BlueCat Networks," Jun. 29, 2010, can be retrieved from http://www.darkreading.com/story/showArticle.jhtml?articleID=225701776, 3 pages.

Meyer, Nathan et al., "F5 and Infoblox DNS Integrated Architecture: Offering a Complete Scalable, Secure DNS Solution," A F5 Networks, Inc. Technical Brief, 2010, 18 pages, Seattle, WA.

Silva, Peter, "DNSSEC: The Antidote to DNS Cache Poisoning and Other DNS Attacks," A F5 Networks, Inc. Technical Brief, 2009, 10 pp., Seattle, WA.

Wikimedia Foundation, Inc., "Domain Name Security Extensions," retrieved Oct. 22, 2010, from http://en.wikipedia.org/wiki/Domain_Name_System_Security_Extensions, 17 pages.

Civil Action 10-332, Report on the Filing or Determination of an Action Regarding a Patent or Trademark, filed on Aug. 5, 2010, 2 pages.

Civil Action 10-332, Notice of Voluntary Dismissal Without Prejudice, filed on Aug. 5, 2010, 2 pages.

Civil Action CV10-03428, Complaint for Patent Infringement, Trade Secret Misappropriation, Breach of Contract, Interference with Prospective Economic Advantage, Interference with Contract, and Unfair Competition Under Cal. Bus. & Prof. Code §§ 17200 et seq., filed on Aug. 4, 2010, with Exhibits A-M, 196 pages.

Civil Action CV10-03428, First Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Oct. 29, 2010, 38 pages.

Civil Action CV10-03428, Second Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., with Exhibits A-P, filed on Apr. 13, 2011, 238 pages.

Civil Action CV10-03428, Third Amended Complaint for Patent Infringement, Copyright Infringement, Trade Secret Misappropriation, Breach of Contract, Breach of Fiduciary Duty, Breach of the Duty of Loyalty, Interference with Prospective Economic Advantage, Interference with Contract, and Unfair Competition Under Cal. Bus. & Prof. Code §§ 17200 et seq., filed on Apr. 29, 2011, 42 pages.

Civil Action CV10-03428, Answer to Third Amended Complaint, Affirmative Defenses, and Counterclaims, filed on May 16, 2011, 40 pages.

Civil Action CV10-03428, Answer to Defendant A10 Networks, Inc.'s Counterclaims, and Counterclaim, filed on May 27, 2011, 12 pages.

Delgadillo, K., "Cisco Distributed Director," Cisco White Paper, 1999, 19 pages.

Table of Contents for 2nd Conference on Telecommunications (ConfTele'99), Apr. 15-16, 1999, 9 pages.

Bernardo, L. et al., "Scalability Issues in Telecommunication Services," in Proceedings of 2nd Conference on Telecommunications (ConfTele'99), Apr. 15-16, 1999, pp. 409-413.

Lin, "VPN Tunnel Balancer," U.S. Appl. No. 60/169,502, filed Dec. 7, 1999, 7 pages.

Cisco Systems, Inc., "Cisco LocalDirector Version 1.6.3 Release Notes," Oct. 1997, 52 pages, San Jose, CA.

Foundry Networks, Inc., "Foundry ServerIron Installation and Configuration Guide," May 2000, 784 pages.

Dell Computer Corporation, "3-DNS Reference Guide, Version 4.2," 2002, 261 pages.

Schemers III, "Ibnamed: A Load Balancing Name Server in Peri," 1995 LISA IX, Sep. 17-22, 1995, Monterey, CA, 13 pages.

Goldszmidt, "Load Distribution for Scalable Web Servers: Summer Olympics 1996," In Proceedings of the 8th IFIP/IEEE International Workshop on Distributed Systems: Operations and Management, Sydney, Australia, Oct. 1997, 10 pages.

"Use F5 Networks' 3DNS Controller to Supercharge Standard DNS Capabilities," Jul. 1999, F5 White Paper, Seattle, WA.

Buyya, "High Performance Cluster Computing: Architectures and Systems," vol. 1, copyright 1999, Prentice Hall PTR, Upper Saddle River, New Jersey 07458, http://www.phptr.com.

Civil Action CV10-03428—A10 Networks, Inc.'s Answer to Plaintiffs Brocade Communications Systems, Inc. and Foundry Networks, LLC's Counterclaims, Filed Jun. 17, 2011, 4 pages.

Civil Action CV10-03428—Notice of Granted Requests for Reexamination of Patents 7,547,508 and 7,270,977, Filed Aug. 1, 2011, 31 pages, including Exhibits A and B.

Civil Action CV10-03428—Notice of Granted Requests for Reexamination of Patents 7,558,195, 7,657,629, 7,840,678, Filed Aug. 5, 2011, 316 pages.

Civil Action CV10-03428—Notice of Granted Requests for Reexamination of Patent 7,584,301, Filed Aug. 12, 2011, 14 pages, including Exhibit A.

Civil Action CV10-03428—Joint Claim Construction, Filed Aug. 26, 2011, 29 pages.

Civil Action CV10-03428—Notice of Granted Requests for Reexamination of Patents 7,774,833; 7,454,500; 7,899,899; 7,754,965; 7,647,427; and 7,716,370, Filed Sep. 6, 2011, 72 pages, including Exhibits A through F.

Civil Action CV10-03428—Defendant's A10 Networks, Inc.'s, Lee Chen's, Rajkumar Jalan's, Ron Szeto's, David Cheung's, Liang Han's, and Steven Hwang's Invalidity Contentions, Filed Jun. 27, 2011, 779 pages, Including Exhibits A through M.

Skene et al., "Method and System for Balancing Load Distribution on a Wide Area Network," U.S. Appl. No. 09/459,815, filed Dec. 13, 1999, 59 pages.

Skene et al., "Method and System for Name Server Load Balancing," U.S. Appl. No. 60/182,812, filed Feb. 16, 2000, 16 pages.

Tsimelzon et al., "Java application framework for an internet content delivery network," U.S. Appl. No. 60/347,481, filed Jan. 11, 2002, 26 pages.

"Foundry Networks Announces Application Aware Layer 7 Switching on ServerIron Platform," Mar. 1999, 4 pages.

Order Construing Disputed Claim Terms of U.S. Patent Nos. 7,647,427; 7,716,370; 7,558,195; 7,454,500; 7,581,009; 7,657,629; 7,584,301; 7,840,678; and 5,875,185, issued Jan. 6, 2012, 33 pages.

Non-Final Office Action for U.S. Appl. No. 12/272,618, mailed on Sep. 29, 2009, 16 pages.

Non-Final Office Action for U.S. Appl. No. 12/272,618, mailed on Feb. 4, 2010, 14 pages.

Notice of Allowance for U.S. Appl. No. 10/206,580, Mailed Jul. 6, 2007, 5 pages.

Notice of Allowance for U.S. Appl. No. 10/376,903, mailed on Oct. 19, 2009, 4 pages.

Non-Final Office Action for U.S. Appl. No. 12/353,701, mailed on Nov. 4, 2009, 22 pages.

Notice of Allowance for U.S. Appl. No. 12/353,701, mailed on Apr. 9, 2010, 5 pages.

Non-Final Office Action for U.S. Appl. No. 12/177,021, mailed Jan. 29, 2010, 8 pages.

Final Office Action for U.S. Appl. No. 12/177,021, mailed Aug. 12, 2010, 20 pages.

F5 Networks, Inc., "Keeping Up with Multi-Service Applications," A F5 Networks, Inc. White Paper Document, Jan. 2006, 8 pages, Seattle, WA.

Citrix Systems, Inc., "NetScaler Global Server Load Balancing for Presentation Server and Access Gateway (All Editions) Deployments," Design Consideration NetScaler 8.0, 2007, 16 pages, Fort Lauderdale, FL.
F5 Networks, Inc., "Optimize Application Delivery Across Your Globally Distributed Data Centers," BIG-IP Global Traffic Manager Datasheet, 2009, 8 pages, Seattle WA.
Stalvig P., "Disaster Recovery: Not Just Planning for the Worst," A F5 Networks, Inc. White Paper Document, 2008, 16 pages, F5 Networks, Inc., Seattle, WA.
Cisco Systems, Inc., "The Global Server Load Balancing Primer," A Cisco Systems, Inc. White Paper Document, 1992-2004, 20 pages, San Jose, CA.
Civil Action 10-332, Complaint for Patent Infringement with Exhibits A-G, filed on Apr. 23, 2010, 131 pages.
Civil Action 10-332, Second Amended and Supplemental Complaint for Patent Infringement with Exhibits H-I, filed on Jul. 16, 2010, 41 pages.
Civil Action CV10-03443, Complaint for Declaratory Judgment with Exhibits A-I, filed on Aug. 6, 2010, 153 pages.
Notice of Allowance for U.S. Appl. No. 10/674,627, mailed on Aug. 19, 2010, 4 pages.
Final Office Action for U.S. Appl. No. 12/272,618, mailed on Nov. 26, 2010, 19 pages.
Office Action for U.S. Appl. No. 11/707,697, mailed on Nov. 22, 2010, 24 pages.
Notice of Allowance for U.S. Appl. No. 12/177,021, mailed Dec. 10, 2010, 20 pages.
A10 Networks, Inc., "A10 Networks Announces Unique and Wide Ranging Customer-Driven Functionality for AX Series Application Delivery Controllers," News Release, Oct. 18, 2010, from http://www.a10networks.com/news/2010/101018-AX_Series_2.6.php, 2 pages.
Notice of Allowance for U.S. Appl. No. 12/787,779, mailed Dec. 20, 2010, 45 pages.
Notice of Allowance for U.S. Appl. No. 12/787,779, mailed Jan. 12, 2011, 48 pages.
Devarapalli et al., U.S. Appl. No. 61/393,796, filed Oct. 15, 2010.
Devarapalli et al., U.S. Appl. No. 12/916,390, filed Oct. 29, 2010.
Joshi et al., U.S. Appl. No. 13/229,380, filed Sep. 9, 2011.
Request for Reexamination of U.S. Patent No. 7,454,500, filed Jun. 27, 2011, 29 pages.
Order Granting Request for Reexamination of U.S. Patent No. 7,454,500, mailed Aug. 12, 2011, Reexamination Control No. 90/011,772, 11 pages.
Office Action for Reexamination Control No. 90/011,772, mailed Oct. 13, 2011, 8 pages.
Ex Parte Reexamination Interview Summary for Reexamination Control No. 90/011,772, mailed on Nov. 29, 2011, 58 pages.
Request for Inter Partes Reexamination of U.S. Patent No. 7,454,500, filed Nov. 4, 2011, 157 pages.
Order Granting Request for Inter Partes Reexamination of U.S. Patent No. 7,454,500 and Office Action for Reexamination Control No. 95/001,806, mailed Dec. 16, 2011, 43 pages.
Terminal Disclaimer for U.S. Appl. No. 11/741,480, filed Jan. 29, 2008, 1 page.
Request for Reexamination of U.S. Patent No. 7,581,009, filed Jun. 27, 2011, 58 pages.
Order Granting Request for Reexamination of U.S. Patent No. 7,581,009, mailed Sep. 21, 2011, Reexamination Control No. 90/011,770, 14 pages.
Request for Inter Partes Reexamination of U.S. Patent No. 7,581,009, filed Nov. 4, 2011, 197 pages.
Non-Final Office Action for U.S. Appl. No. 12/496,560, mailed on Sep. 17, 2010, 27 pages.
Final Office Action for U.S. Appl. No. 12/496,560, mailed on Jan. 28, 2011, 10 pages.
Notice of Allowance for U.S. Appl. No. 12/496,560, mailed on May 16, 2011, 11 pages.
Non-Final Office Action for U.S. Appl. No. 12/272,618, mailed on Jun. 14, 2011, 13 pages.
Non-Final Office Action for U.S. Appl. No. 11/429,177, mailed May 19, 2011, 87 pages.
Non-Final Office Action for U.S. Appl. No. 11/429,177, mailed Oct. 18, 2011, 25 pages.
Request for Reexamination of U.S. Patent No. 7,657,629, filed Jun. 27, 2011, 36 pages.
Ex Parte Interview Summary for Reexamination Control No. 90/011,766, Jul. 14, 2011, 3 pages.
Order Granting Request for Reexamination of U.S. Patent No. 7,657,629, mailed Jul. 30, 2011, Reexamination Control No. 90/011,766, 10 pages.
Office Action for Reexamination Control No. 90/011,766, mailed on Oct. 4, 2011, 7 pages.
Ex Parte Reexamination Interview Summary for Reexamination Control No. 90/011,766, mailed on Nov. 29, 2011, 57 pages.
Request for Inter Partes Reexamination for U.S. Patent No. 7,657,629 B1, filed Nov. 17, 2011, 238 pages.
Order Granting Request for Inter Partes Reexamination of U.S. Patent No. 7,657,629 and Office Action for Reexamination Control No. 95/001,824, mailed Jan. 12, 2012, 33 pages.
Final Office Action for U.S. Appl. No. 11/707,697, mailed on Apr. 20, 2011, 10 pages.
Notice of Allowance for U.S. Appl. No. 11/707,697, mailed on Aug. 5, 2011, 9 pages.
Notice of Allowance for U.S. Appl. No. 11/707,697, mailed Aug. 12, 2011, 6 pages.
Final Office Action for U.S. Appl. No. 12/635,371, mailed on Mar. 16, 2011, 7 pages.
Non-Final Office Action for U.S. Patent App. No. 12/635,371, mailed on Jun. 8, 2011, 9 pages.
Request for Reexamination of U.S. Patent No. 7,574,508, filed Jun. 27, 2011, 21 pages.
Order Granting Request for Reexamination of U.S. Patent No. 7,574,508, mailed Jul. 22, 2011, Reexamination Control No. 90/011,764, 15 pages.
Office Action for Reexamination Control No. 90/011,764, mailed on Nov. 14, 2011, 18 pages.
Office Action for Reexamination Control No. 90/011,764, mailed on Nov. 18, 2011, 18 pages.
Ex Parte Reexamination Interview Summary for Reexamination Control No. 90/011,764, mailed on Jan. 6, 2012, 52 pages.
Request for Inter Partes Reexamination of U.S. Patent No. 7,574,508, filed Nov. 4, 2011, 70 pages.
Order Granting Request for Inter Partes Reexamination of U.S. Patent No. 7,574,508 and Office Action for Reexamination Control No. 90/001,804, mailed Dec. 8, 2011, 20 pages.
Non-Final Office Action for U.S. Appl. No. 12/506,137, mailed on Nov. 23, 2011, 63 pages.
Decision on Appeal for U.S. Appl. No. 10/305,823, mailed on Jul. 11, 2011, 10 pages.
Decision on Request for Rehearing for U.S. Appl. No. 10/305,823, mailed on Nov. 1, 2011, 5 pages.
Request for Reexamination of U.S. Patent No. 7,584,301, filed Jun. 27, 2011, 36 pages.
Order Granting Request for Reexamination of U.S. Patent No. 7,584,301, mailed Aug. 8, 2011, Reexamination Control No. 90/011,765, 10 pages.
Office Action in Ex Parte Reexamination for Control No. 90/011,765, mailed on Oct. 13, 2011, 7 pages.
Ex Parte Reexamination Interview Summary for Reexamination Control No. 90/011,765, mailed on Nov. 29, 2011, 57 pages.
Request for Inter Partes Reexamination of U.S. Patent No. 7,584,301, filed Nov. 8, 2011, 194 pages.
Order Granting Request for Inter Partes Reexamination of U.S. Patent No. 7,584,301 and Office Action for Reexamination Control No. 95/001,812, mailed Dec. 28, 2011, 25 pages.
Request for Reexamination of U.S. Patent No. 7,840,678, filed Jun. 27, 2011, 25 pages.
Ex Parte Interview Summary for Reexamination Control No. 90/011,763, mailed Jul. 5, 2011, 3 pages.
Order Granting Request for Reexamination of U.S. Patent No. 7,840,678, mailed Jul. 29, 2011, Reexamination Control No. 90/011,763, 10 pages.
Notice of Allowance for U.S. Appl. No. 12/506,130, mailed on Oct. 12, 2010, 49 pages.

Non-Final Office Action for U.S. Appl. No. 12/635,371, mailed on Oct. 7, 2010, 44 pages.
Non-Final Office Action for U.S. Patent No. 12/506,137, mailed on Oct. 7, 2010, 26 pages.
Civil Action 10-332—*Brocade Communication Systems, Inc.* v. *A10 Networks, Inc.*—Civil Cover Sheet, filed on Apr. 23, 2010, 1 page.
Civil Action—Case No. CV10-03443—Complaint for Declaratory Judgment, filed on Aug. 6, 2010, with Exhibits A through I, 153 pages.
Civil Action—Case No. CV10-03443—Notice of Voluntary Dismissal Without Prejudice, filed on Aug. 16, 2010, 2 pages.
Civil Action—CV10-03428—Order Reassigning Case. Case reassigned to Judge Hon. Lucy H. Koh for all further proceedings. Judge Magistrate Judge Elizabeth D. Laporte no longer assigned to the case, filed Aug. 16, 2010, 1 page.
Civil Action—CV10-03428—Motion to Dismiss Complaint filed by A10 Networks, Inc., Lee Chen, Rajkumar Jalan, Ron Szeto, filed Oct. 11, 2010, 30 pages.
Civil Action CV10-03428—Defendant, David Cheung's Answer to Plaintiff's First Amended Complaint, filed Nov. 11, 2010, 32 pages.
Civil Action CV10-03428—Notice of Motion and Motion to Dismiss First Amended Complaint filed by A10 Networks, Inc., Lee Chen, Rajkumar Jalan, Ron Szeto, filed Nov. 12, 2010, 34 pages.
Civil Action CV10-03428—Declaration of Scott R. Mosko in Support of Motion to Dismiss First Amended Complaint, filed by A10 Networks, Inc., Lee Chen, Rajkumar Jalan, Ron Szeto, filed Nov. 12, 2010, 56 pages. Included: Exhibits A and B.
Civil Action CV10-03428—Memorandum in Opposition re Motion to Dismiss First Amended Complaint, filed by Brocade Communications Systems, Inc., Foundry Networks, LLC, filed Jan. 27, 2011, 33 pages.
Civil Action CV10-03428—Reply to Opposition re Motion to Dismiss First Amended Complaint, filed by A10 Networks, Inc., Lee Chen, Liang Han, Steve Hwang, Rajkumar Jalan, Ron Szeto, filed Feb. 3, 2011, 20 pages.
Civil Action CV10-03428—Order by Judge Lucy H. Koh granting in part and denying in part Motion to Dismiss First Amended Complaint, filed Mar. 23, 2011, 19 pages.
Civil Action CV10-03428—Motion to Stay Defendants' Motion to Stay Proceedings Pending Reexaminations filed by A10 Networks, Inc., Lee Chen, Liang Han, Steve Hwang, Rajkumar Jalan, Ron Szeto, filed Jul. 1, 2011, 26 pages. Included: Affidavit Declaration of Scott R. Mosko in Support of Motion; Proposed Order, Exhibits 1 and 2.
Civil Action CV10-03428—Opposition to Motion to Stay Proceedings Pending Reexaminations, filed by Brocade Communications Systems, Inc., Foundry Networks, LLC, filed Jul. 15, 2011, 20 pages. Included: Proposed Order.
Civil Action CV10-03428—Declaration of Siddhartha M. Venkatesan in Support of Opposition/Response to Motion, Plaintiffs' Opposition to Defendants' Motion to Stay Proceedings, filed by Brocade Communications Systems, Inc., Foundry Networks, LLC, filed Jul. 15, 2011, 70 pages. Included: Exhibits A through E.
Civil Action CV10-03428—Reply to Plaintiffs' Opposition to Defendants' Motion to Stay Proceedings Pending Reexaminations, filed by A10 Networks, Inc., filed Jul. 22, 2011, 34 pages. Included: Declaration of Scott R. Mosko, Exhibits A, C, and D.
Civil Action CV10-03428—Memorandum in Support of Motion for Temporary Restraining Order and Preliminary Injunction [Redacted Version] filed by Brocade Communications Systems, Inc., Foundry Networks, LLC, filed Jul. 26, 2011, 34 pages. Included: Proposed Order for Temporary Restraining Order and Order to Show Cause and Proposed Preliminary Injunction.
Civil Action CV10-03428—Declaration of Andrew (Andy) Guerrero in Support of Motion for Temporary Restraining Order [Redacted Version] of Plaintiffs' Memorandum In Support Of Motion For Temporary Restraining Order and Preliminary Injunction [Redacted Version] of Andrew (Andy) Guerrero ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Fabio E. Marino in Support of Motion for Temporary Restraining Order [Redacted Version] of Plaintiffs' Memorandum In Support Of Motion For Temporary Restraining Order And Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 2 pages.
Civil Action CV10-03428—Declaration of Keith Stewart in Support of Motion for Temporary Restraining Order [Redacted Version] of Plaintiffs' Memorandum In Support Of Motion For Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Civil Action CV10-03428—Declaration of Mani Prasad Kancherla in Support of Motion for Temporary Restraining Order [Redacted Version] of Plaintiffs' Memorandum in Support of Motion for Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 5 pages.
Civil Action CV10-03428—Declaration of Prasad Aluri in Support of Motion for Temporary Restraining Order [Redacted Version] of Plaintiffs' Memorandum In Support Of Motion for Temporary Restraining Order And Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 3 pages.
Civil Action CV10-03428—Declaration of Robert D. Young in Support of Motion for Temporary Restraining Order [Redacted Version] of Plaintiffs' Memorandum In Support Of Motion For Temporary Restraining Order And Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 46 pages. Included: Redacted Exhibits 1 through 8.
Civil Action CV10-03428—Declaration of Lisa McGill in Support of Motion for Temporary Restraining Order [Redacted Version] of Plaintiffs' Memorandum in Support Of Motion For Temporary Restraining Order and Preliminary Injunction [Redacted Version] of Declaration of Fabio E. Marino ISO Plaintiffs' Motion for TRO and Preliminary Injunction filed by Brocade Communications Systems, Inc., Foundry Networks, LLC, filed Jul. 26, 2011, 506 pages. Included: Exhibits 1 through 30.
Civil Action CV10-03428 -Plaintiffs' Reply Memorandum In Further Support Of Motion For Temporary Restraining Order And Preliminary Injunction[Redacted Version] filed by Brocade Communications Systems, Inc., Foundry Networks, LLC, filed Aug. 4, 2011, 22 pages.
Civil Action CV10-03428—Notice of Errata re Reply Memorandum in Further Support of Motion for Temporary Restraining Order and Preliminary Injunction, filed by Brocade Communications Systems, Inc., Foundry Networks, LLC, filed Aug. 5, 2011, 2 pages.
Civil Action CV10-03428—Order by Judge Lucy H. Koh denying Motion to Stay; finding as moot Motion to Compel; denying Motion to Qualify Expert Kevin Jeffay Under the Protective Order; granting in part and denying in part Motion for Sanctions; granting Motion to Order A10 to File Confidential Information Under Seal; granting Motion for Leave to File Supplemental Authority, filed Aug. 12, 2011, 2 pages.
Civil Action CV10-03428 -Order Denying Motion for Temporary Restraining Order [Redacted Version] of Plaintiffs' Memorandum In Support Of Motion For Temporary Restraining Order And Preliminary Injunction, filed by Brocade Communications Systems, Inc., Foundry Networks, LLC, filed Aug. 16, 2011, 5 pages.
Civil Action CV10-03428—Notice of Granted Request for Reexamination of U.S. Patent No. 7,581,009, filed Sep. 27, 2011, 18 pages.
Civil Action CV10-03428—Redacted Declaration of David Klausner in Support of Opposition to Plaintiffs' Motion for Temporary Restraining Order and Preliminary Injunction, by A10 Networks, Inc., filed Sep. 28, 2011, 9 pages.
Civil Action CV10-03428 -Redacted Declaration of Dr. Chi Zhang in Support of Opposition to Plaintiffs' Motion for Temporary Restraining Order and Preliminary Injunction, filed by A10 Networks, Inc., filed Sep. 28, 2011, 4 pages.

Civil Action CV10-03428—Notice of Motion for Partial Summary Judgment on Assignor Estoppel, filed by Brocade Communications Systems, Inc., Foundry Networks, LLC, filed Oct. 11, 2011, 21 pages.
Civil Action CV10-03428—Declaration of Teri H.P. Nguyen in Support of Motion for Partial Summary Judgment Notice of Motion and Motion for Partial Summary Judgment on Assignor Estoppel, filed by Brocade Communications Systems, Inc., Foundry Networks, LLC, filed Oct. 11, 2011, 259 pages. Included: Exhibits A through R.
Civil Action CV10-03428—Initial Claim Construction Brief, filed by Brocade Communications Systems, Inc., Foundry Networks, LLC, filed Oct. 11, 2011, 31 pages.
Civil Action CV10-03428—Declaration of Nitin Gambhir of Brocade Communications Systems, Inc. and Foundry Networks, LLC's Motion for Summary Judgment of Infringement of U.S. Patent Nos. 7,454,500; 7,581,009; 7,657,629; 7,584,301; 7,840,678; 7,716,370; 7,647,427; and 7,558,195 filed by Brocade Communications Systems, Inc., Foundry Networks, LLC., filed Oct. 11, 2011, 251 pages. Included: Exhibits A through H and Proposed Order.
Civil Action CV10-03428—Administrative Motion to File Under Seal Brocade Communications Systems, Inc. and Foundry Networks, LLC's Administrative Motion for Leave to File Under Seal Notice of Errata and Submission of Corrected Brief, filed by Brocade Communications Systems, Inc., Foundry Networks, LLC, filed Oct. 13, 2011, 8 pages. Included: Proposed Order and Declaration.
Civil Action CV10-03428—Order by Judge Lucy H. Koh denying Motion for Leave to File Excess Pages and Striking Plaintiffs' Motion for Summary Judgment on Infringement, filed Oct. 18, 2011, 2 pages.
Civil Action CV10-03428—Declaration of Nitin Gambhir in Support of Brocade Communications, Inc. and Foundry Networks, LLCs Motion for Summary Judgment of Infringement of U.S. Patent Nos. 7,454,500; 7,581,009; 7,657,629; 7,584,301; and 7,840,678, filed by Brocade Communications Systems, Inc., Foundry Networks, LLC, filed Oct. 21, 2011, 162 pages.
Civil Action CV10-03428—Opposition re Motion for Partial Summary Judgment on Assignor Estoppel Defendant and Counterclaimant A10 Networks, Inc.'s, and Defendants Lee Chen's, Rajkumar Jalan's, and Ron Szeto's Opposition to Plaintiffs Brocade Communications Systems, Inc.'s and Foundry Networks, LLC's Motion for Partial Summary Judgment on Assignor Estoppel, filed by A10 Networks, Inc., Lee Chen, Rajkumar Jalan, Ron Szeto, filed Nov. 8, 2011, 17 pages.
Civil Action CV10-03428—Responsive Claim-Construction Brief (PLR 4-5(b)) by A10 Networks, Inc., Lee Chen, Rajkumar Jalan, filed Nov. 15, 2011, 28 pages.
Civil Action CV10-03428—Declaration of Scott R. Mosko in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed Nov. 15, 2011, 70 pages. Included: Exhibits A through F.
Civil Action CV10-03428—Declaration of J. Douglas Tygar, Ph.D. in Support of Defendant and Counterclaimant A10 Networks, Inc.'s and Defendants Lee Chen's and Rajkumar Jalan's Responsive Claim Construction Brief (PLR 4-5(b)) filed by A10 Networks, Inc., Lee Chen, Rajkumar Jalan, filed on Nov. 15, 2011, 77 pages.
Civil Action CV10-03428—Opposition re Motion for Summary Judgment Of Noninfringement of U.S. Patent No. 5,875,185; Motion for Partial Summary Judgment of U.S. Patent Nos. 7,454,500; 7,581,009; 7,657,629; 7,584,301; and 7,840,678, filed by A10 Networks, Inc., Lee Chen, Rajkumar Jalan, filed Nov. 15, 2011, 20 pages.
Civil Action CV10-03428—Declaration of Scott R. Mosko in Support of Defendant and Counterclaimant A10 Networks, Inc.s, and Defendants Lee Chens and Rajkumar Jalans Opposition to Plaintiffs Brocade Communications, Inc. And Foundry Networks, LLCs Motion for Partial Summary Judgment of U.S. Patent Nos. 7,454,500; 7,581,009; 7,657,629; 7,584,301; and 7,840,678 filed by A10 Networks, Inc., Lee Chen, Rajkumar Jalan, filed Nov. 15, 2011, 16 pages.
Civil Action CV10-03428—Administrative Motion to Consider Whether Cases Should be Related, filed by Brocade Communications Systems, Inc., Foundry Networks, LLC, filed Nov. 21, 2011, 8 pp.. Included: Declaration and Proposed Order.

Civil Action CV10-03428—Reply Claim Construction Brief filed by Brocade Communications Systems, Inc., Foundry Networks, LLC, filed Nov. 22, 2011, 22 pages.
Civil Action CV10-03428—Declaration of Nitin Gambhir in Support of Reply Claim Construction Brief, filed by Brocade Communications Systems, Inc., Foundry Networks, LLC, filed Nov. 22, 2011, 12 pages. Included: Exhibit A.
Civil Action CV10-03428 -Motion to Stay Defendant and Counterclaimant A10 Networks, Inc.'s and Defendants Lee Chen's Rajkumar Jalan's, Ron Szeto's and Steve Hwang's Renewed Motion to Stay All Proceedings Pending Inter Partes Reexamination (All Patents Asserted by Plaintiffs) filed by A10 Networks, Inc., Lee Chen, Steve Hwang, Rajkumar Jalan, Ron Szeto, filed Nov. 23, 2011, 15 pages. Included: Proposed Order.
Civil Action CV10-03428—Declaration of Scott A. Herbst Declaration of Scott A. Herbst In Support of Defendant and Counterclaimant A10 Networks, Inc.s and Defendants Lee Chens, Rajkumar Jalans, Ron Szetos, and Steve Hwangs Renewed Motion To Stay All Proceedings Pending Inter Partes Reexamination (All Patents Asserted By Plaintiffs) filed by A10 Networks, Inc., Lee Chen, Steve Hwang, Rajkumar Jalan, Ron Szeto, filed Nov. 23, 2011, 25 pages. Included: Exhibits 1 through 6.
Civil Action CV10-03428—Litigation Docket, printed on Nov. 26, 2011, 2011, 44 pages.
Notice of Reexamination Request Filing Date and Notice of Assignment of Reexamination Request, mailed Jun. 30, 2011, Reexamination Control No. 90/011,761, 2 pages.
Ex Parte Interview Summary for Reexamination Control No. 90/011,761, mailed Jul. 6, 2011, 3 pages.
Decision on Petition for Extension of Time in Reexamination (Granted), mailed Jan. 3, 2012, Reexamination Control No. 90/011,761, 3 pages.
Final Office Action for Reexamination Control No. 90/011,761, mailed on Mar. 26, 2012, 17 pages.
Notice of Inter Partes Reexamination Request Filing Date and Notice of Assignment of Inter Partes Reexamination Request, mailed Dec. 1, 2011, Reexamination Control No. 95/001,827, 2 pages.
Order Granting Request for Inter Partes Reexamination of U.S. Patent No. 7,756,965, mailed Feb. 13, 2012, Reexamination Control No. 95/001,827, 18 pages.
Decision on Petition for Extension of Time in Reexamination (Granted), mailed Mar. 30, 2012, Reexamination Control No. 95/001,827, 3 pages.
Notice of Reexamination Request Filing Date and Notice of Assignment of Reexamination Request, mailed Jul. 8, 2011, Reexamination Control No. 90/011,760, 2 pages.
Ex Parte Interview Summary for Reexamination Control No. 90/011,760, mailed Jul. 18, 2011, 3 pages.
Decision on Petition for Extension of Time in Reexamination (Granted), mailed Jan. 5, 2012, Reexamination Control No. 90/011,760, 3 pages.
Notice of Inter Partes Reexamination Request Filing Date and Notice of Assignment of Inter Partes Reexamination Request, mailed Nov. 29, 2011, Reexamination Control No. 95/001,826, 2 pages.
Order Granting Request for Inter Partes Reexamination of U.S. Patent No. 7,899,899 and Office Action for Reexamination Control No. 95/001,826, mailed Feb. 7, 2012, 19 pages.
Decision on Petition for Extension of Time in Reexamination (Granted), mailed Apr. 4, 2012, Reexamination Control No. 95/001,826, 3 pages.
Information Disclosure Statement filed on Apr. 4, 2004, for U.S. Patent No. 7,308,475, 5 pages.
Release Note: 3-DNS Controller, version 4.5, Mar. 5, 2007, 19 pages.
F5 Networks' Newest Wide Area Traffic Management Solution Enables Enterprises to Meet Global e-Business Objectives, Business Wire, Feb. 19, 2002, 4 pages.
Release Note: 3-DNS Controller, version 4.2, Feb. 13, 2002, 23 pages.
Huang et al., "A DNS Reflection Method for Global Traffic Management," Proceedings USENIX Annual Technical Conference (ATC10), 2010, 7 pages.

Civil Action CV10-03428—Stipulation Regarding Plaintiffs' Motion for Partial Summary Judgment of Assignor Estoppel, filed Nov. 30, 2011, 2 pages.
Civil Action CV10-03428—Brocade's Opposition to Defendant's Motion to Stay Proceedings Pending Reexaminations, filed Dec. 7, 2011, 18 pages.
Civil Action CV10-03428—Defendant and Counterclaimant A10 Networks, Inc.'s and Defendants Lee Chen's, Rajkumar Jalan's, Ron Szeto's, and Steve Hwang's Reply in Support of its Renewed Motion to Stay Proceedings Pending Inter Partes Reexaminations (All Patents Asserted by Plaintiffs), Filed Dec. 14, 2011, 11 pages.
Civil Action CV10-03428—Defendant and Counterclaimant A10 Networks, Inc.'s Notice of Granted Requests for Inter Partes Reexamination of Plaintiffs' U.S. Patent Nos. 7,558,195; 7,454,500; 7,574,508; and 7,720,977, filed Dec. 28, 2011, 3 pages.
Civil Action CV10-03428—Defendant and Counterclaimant A10 Networks, Inc.'s Notice of Granted Request for Inter Partes Reexamination of Plaintiffs' U.S. Patent No. 7,581,301, filed Dec. 29, 2011, 3 pages.
Civil Action CV10-03428—Defendant and Counterclaimant A10 Networks, Inc.'s Notice of Granted Request for Inter Partes Reexamination of Plaintiffs' U.S. Patent Nos. 7,657,629 and 7,840,678, filed Jan. 20, 2012, 3 pages.
Civil Action CV10-03428—Defendant and Counterclaimant A10 Networks, Inc.'s Notice regarding Inter Partes Reexaminations of Plaintiffs' Asserted Patents: (i) Four Newly-Granted Requests (U.S. Patent Nos. 7,774,833; 7,647,427; 7,716,370; 7,581,009); and (ii) Status Updated for Eleven Already-Instituted Reexaminations (U.S. Patent Nos. 7,774,833; 7,647,427; 7,716,370; 7,581,009; 7,657,629; 7,840,678; 7,584,301; 7,558,195; 7,454,500; 7,720,977; and 7,574,508), filed Feb. 6, 2012, 3 pages.
Civil Action CV10-03428—Defendant and Counterclaimant A10 Networks, Inc.'s Notice of Granted Request for Inter Partes Reexamination of Plaintiffs' U.S. Patent No. 7,756,965 and Status Update, filed Feb. 16, 2012, 3 pages.
Notice of Reexamination Request Filing Date and Notice of Assignment of Reexamination Request, mailed Jul. 1, 2011, Reexamination Control No. 90/011,772, 2 pages.
Ex Parte Reexamination Interview Summary for Reexamination Control No. 90/011,772, mailed Jul. 21, 2011, 3 pages.
Decision on Petition for Extension of Time in Reexamination (Granted), mailed Nov. 17, 2011, Reexamination Control No. 90/011,772, 3 pages.
Ex Parte Reexamination Interview Summary for Reexamination Control No. 90/011,772, mailed on Apr. 10, 2012, 3 pages.
Notice of Assignment of Inter Partes Reexamination Request and Notice and Reexamination Request Filing Date, mailed Nov. 18, 2011, Reexamination Control No. 95/001,806, 2 pages.
Third Party Requester's Opposition to Petition to Vacate, for Reexamination Control No. 95/001,806, filed Mar. 1, 2012, 15 pages.
Third Party Requester's Opposition to Petition to Suspend Reexamination for Reexamination Control No. 95/001,806, filed Mar. 2, 2012, 14 pages.
Third Party Requester's Comments under 35 U.S.C. § 314(B)(2) and 37 C.F.R. § 1.947, for Reexamination Control No. 95/001,806, filed Mar. 19, 2012, 36 pages.
Third Party Requester's Opposition to Patent Owner's Petition to "Supplement," for Reexamination Control No. 95/001,806, filed Apr. 19, 2012, 21 pages.
Notice of Reexamination Request Filing Date and Notice of Assignment of Reexamination Request, mailed Jul. 8, 2011, Reexamination Control No. 90/011,770, 2 pages.
Ex Parte Reexamination Interview Summary, for Reexamination Control No. 90/011,770, mailed Jul. 18, 2011, 2 pages.
Office Action for Reexamination Control No. 90/011,770, mailed Feb. 16, 2012, 35 pages.
Ex Parte Reexamination Interview Summary, for Reexamination Control No. 90/011,770, mailed Mar. 27, 2012, 3 pages.
Decision on Petition for Extension of Time in Reexamination (Granted), mailed Mar. 28, 2012, Reexamination Control No. 90/011,770, 3 pages.

Notice of Assignment of Inter Partes Reexamination Request and Notice of Reexamination Request Filing Date, mailed Nov. 10, 2011, Reexamination Control No. 95/001,807, 2 pages.
Order Granting Request for Inter Partes Reexamination of U.S. Patent No. 7,581,009 and Office Action for Reexamination Control No. 95/001,807, mailed Jan. 31, 2012, 23 pages.
Decision on Petition for Extension of Time in Reexamination (Granted), mailed Mar. 30, 2012, Reexamination Control No. 95/001,807, 3 pages.
Third Party Requester's Opposition to Petition to Vacate, for Reexamination Control No. 95/001,807, filed Apr. 16, 2012, 17 pages.
Office Communication for U.S. Appl. No. 12/496,560, mailed on Jun. 14, 2011, 5 pages.
Final Office Action for U.S. Appl. No. 12/272,618, mailed on Feb. 28, 2012, 12 pages.
Notice of Reexamination Request Filing Date and Notice of Assignment of Reexamination Request, mailed Jul. 7, 2011, Reexamination Control No. 90/011,766, 2 pages.
Decision on Petition for Extension of Time in Reexamination (Granted), mailed Dec. 2, 2011, Reexamination Control No. 90/011,766, 3 pages.
Notice of Inter Partes Reexamination Request Filing Date and Notice of Assignment of Inter Partes Reexamination Request, mailed Dec. 5, 2011, Reexamination Control No. 95/001,824, 2 pages.
Third Party Requester's Comments under 35 U.S.C. § 314(B)(2) and 37 C.F.R. § 1.947, for Reexamination Control No. 95/001,824, filed Apr. 11, 2012, 21 pages.
Office Communication for U.S. Appl. No. 12/635,371, mailed on Mar. 24, 2011, 29 pages.
Non-Final Office Action for U.S. Appl. No. 12/635,371, mailed on Feb. 15, 2012, 10 pages.
Notice of Reexamination Request Filing Date and Notice of Assignment of Reexamination Request, mailed Jun. 29, 2011, Reexamination Control No. 90/011,764, 2 pages.
Ex Parte Interview Summary for Reexamination Control No. 90/011,764, Jul. 21, 2011, 3 pages.
Decision on Petition for Extension of Time in Reexamination (Granted), mailed Jan. 3, 2012, Reexamination Control No. 90/011,764, 3 pages.
Notice of Inter Partes Reexamination Request Filing Date and Notice of Assignment of Inter Partes Reexamination Request, mailed Nov. 8, 2011, Reexamination Control No. 95/001,804, 2 pages.
Third Party Requester's Comments under 35 U.S.C. § 314(B)(2) and 37 C.F.R. § 1.947, with Exhibits A-E, for Reexamination Control No. 95/001,804, filed Mar. 9, 2012, 79 pages.
Notice of Reexamination Request Filing Date and Notice of Assignment of Reexamination Request, mailed Jul. 6, 2011, Reexamination Control No. 90/011,765, 2 pages.
Ex Parte Interview Summary for Reexamination Control No. 90/011,765, Jul. 6, 2011, 3 pages.
Decision on Petition for Extension of Time in Reexamination (Granted), mailed Dec. 9, 2011, Reexamination Control No. 90/011,765, 3 pages.
Notice of Inter Partes Reexamination Request Filing Date and Notice of Assignment of Inter Partes Reexamination Request, mailed Nov. 21, 2011, Reexamination Control No. 95/001,812, 2 pages.
Third Party Requester's Comments under 35 U.S.C. § 314(B)(2) and 37 C.F.R. § 1.947, for Reexamination Control No. 95/001,812, filed Mar. 29, 2012, 33 pages.
Notice of Reexamination Request Filing Date and Notice of Assignment of Reexamination Request, mailed Jul. 1, 2011, Reexamination Control No. 90/011,763, 2 pages.
Decision on Petition for Extension of Time in Reexamination (Granted), mailed Nov. 17, 2011, Reexamination Control No. 90/011,763, 3 pages.
Final Office Action for Reexamination Control No. 90/011,763, mailed on Apr. 25, 2012, 51 pages.
Notice of Inter Partes Reexamination Request Filing Date and Notice of Assignment of Inter Partes Reexamination Request, mailed Nov. 23, 2011, Reexamination Control No. 95/001,822, 2 pages.
Third Party Requester's Comments under 35 U.S.C. § 314(B)(2) and 37 C.F.R. § 1.947, for Reexamination Control No. 95/001,822, filed Apr. 11, 2012, 37 pages.

Action Closing Prosecution, for Reexamination Control No. 95/001,822, mailed May 5, 2012, 45 pages.
Action Closing Prosecution, for Reexamination Control No. 95/001,812, mailed Jun. 2, 2012, 49 pages.
Final Office Action for Reexamination Control No. 90/011,772, mailed May 17, 2012, 53 pages.
Third Party Requester's Comments under 35 U.S.C. § 314(B)(2) and 37 C.F.R. § 1.947, with Exhibits 1-7, for Reexamination Control No. 95/001,807, filed May 30, 2012, 145 pages.
Office Action for U.S. Appl. No. 12/496,560, mailed on Jun. 15, 2012, 30 pages.
Final Office Action for Reexamination Control No. 90/011,765, mailed May 16, 2012, 59 pages.
Final Office Action for U.S. Appl. No. 13/101,398, mailed on Jun. 11, 2012, 56 pages.
Third Party Requester's Comments under 35 U.S.C. § 314(B)(2) and 37 C.F.R. § 1.947, for Reexamination Control No. 95/001,827, filed Jun. 13, 2012, 40 pages.
Final Office Action and Interview Summary for Reexamination Control No. 90/011,760, mailed Mar. 21, 2012, 14 pages.
Third Party Requester's Comments under 35 U.S.C. § 314(B)(2) and 37 C.F.R. § 1.947, for Reexamination Control No. 95/001,826, filed Jun. 6, 2012, 46 pages.
Ex Parte Reexamination Interview Summary for Reexamination Control No. 90/011,772, mailed on Jun. 29, 2012, 6 pages.
Ex Parte Reexamination Interview Summary, for Reexamination Control No. 90/011,770, mailed Jul. 20, 2012, 3 pages.
Notice of Intent to Issue Ex Parte Reexamination Certificate for Reexamination Control No. 90/011,770, mailed on Jul. 30, 2012, 21 pages.
Third Party Requester's Refiling of Certificate of Service for Requester Comments, for Reexamination Control No. 95/001,807, filed Jun. 21, 2012, 3 pages.
Third Party Requester's Opposition to Petition to Refuse Entry of Requester's Comments, for Reexamination Control No. 95/001,807, filed Jul. 12, 2012, 5 pages.
Final Office Action for U.S. Appl. No. 11/429,177, mailed Jun. 20, 2012, 47 pages.
Final Office Action for Reexamination Control No. 90/011,766, mailed on Jul. 17, 2012, 76 pages.
Action Closing Prosecution, for Reexamination Control No. 95/001,824, mailed Jul. 17, 2012, 35 pages.
Final Office Action for U.S. Appl. No. 12/635,371, mailed on Jul. 13, 2012, 10 pages.
Office Communication for U.S. Appl. No. 12/635,371, mailed on Jul. 25, 2012, 42 pages.
Notice of Intent to Issue Ex Parte Reexamination Certificate for Reexamination Control No. 90/011,764, mailed on Jun. 21, 2012, 56 pages.
Action Closing Prosecution for Reexamination Control No. 95/001,804, mailed Jun. 21, 2012, 74 pages.
Final Office Action for U.S. Appl. No. 12/506,137, mailed on Jul. 20, 2012, 46 pages.
Advisory Action for Reexamination Control No. 90/011,765, mailed Jul. 20, 2012, 12 pages.
Third Party Requester's Refiling of Certificate of Service for Requester Comments, for Reexamination Control No. 95/001,812 filed Jun. 21, 2012, 3 pages.
Third Party Requester's Comments under 35 U.S.C. § 314(B)(2) and 37 C.F.R. § 1.947, for Reexamination Control No. 95/001,812, filed Aug. 1, 2012, 29 pages.
Advisory Action for Reexamination Control No. 90/011,763, mailed on Jul. 13, 2012, 14 pages.
Third Party Requester's Comments under 35 U.S.C. § 314(B)(2) and 37 C.F.R. § 1.947, for Reexamination Control No. 95/001,822, filed Jul. 5, 2012, 27 pages.
Right of Appeal Notice, for Reexamination Control No. 95/001,822, mailed Aug. 9, 2012, 26 pages.
Advisory Action for Reexamination Control No. 90/011,761, mailed on Jul. 17, 2012, 11 pages.
Third Party Requester's Refiling of Certificate of Service for Requester Comments, for Reexamination Control No. 95/001,827, filed Jun. 21, 2012, 3 pages.
Third Party Requester's Opposition to Petition to Refuse Entry of Requester's Comments, for Reexamination Control No. 95/001,827, filed Jul. 12, 2012, 5 pages.
Advisory Action for Reexamination Control No. 90/011,760, mailed Jul. 17, 2012, 10 pages.
Third Party Requester's Refiling of Certificate of Service for Requester Comments, for Reexamination Control No. 95/001,826, filed Jun. 21, 2012, 3 pages.
Third Party Requester's Opposition to Petition to Refuse Entry of Requester's Comments, for Reexamination Control No. 95/001,826, filed Jul. 12, 2012, 5 pages.
Non-Final Office Action for U.S. Appl. No. 12/916,390, mailed on Jul. 30, 2012, 45 pages.
Ex Parte Reexamination Certificate for Reexamination Control No. 90/011,764, mailed on Aug. 14, 2012, 2 pages.

* cited by examiner

CONFIGURABLE GEOGRAPHIC PREFIXES FOR GLOBAL SERVER LOAD BALANCING

CROSS REFERENCE TO RELATED APPLICATIONS

The present application is a continuation of and claims the benefit under 35 U.S.C. §120 to U.S. patent application Ser. No. 12/787,779, entitled "CONFIGURABLE GEOGRAPHIC PREFIXES FOR GLOBAL SERVER LOAD BALANCING," filed May 26, 2010 (now issued as U.S. Pat. No. 7,899,899), which in turn is a continuation of and claims the benefit under 35 U.S.C. §120 to U.S. patent application Ser. No. 12/353,701, entitled "CONFIGURABLE GEOGRAPHIC PREFIXES FOR GLOBAL SERVER LOAD BALANCING," filed Jan. 14, 2009 (now U.S. Pat. No. 7,756,965), which in turn is a continuation of and claims the benefit under 35 U.S.C. §120 to U.S. patent application Ser. No. 10/840,496, entitled "CONFIGURABLE GEOGRAPHIC PREFIXES FOR GLOBAL SERVER LOAD BALANCING," filed May 6, 2004 (now U.S. Pat. No. 7,496,651), all of which are assigned to the same assignee as the present application, and which are incorporated herein by reference in their entireties.

TECHNICAL FIELD

This disclosure relates generally to load balancing among servers. More particularly but not exclusively, the present disclosure relates to techniques to configure geographic information, such as geographic prefixes and geographic region designations for network addresses, for use in load balancing to determine a geographically optimum server to receive a client request.

BACKGROUND INFORMATION

Under the Transmission Control Protocol/Internet Protocol (TCP/IP), when a client provides a symbolic name (a Uniform Resource Locator or URL) to request access to an application program or another type of resource, the host name portion of the URL needs to be resolved into an IP address of a server for that application program or resource. For example, the URL (e.g., http://www.foundrynet.com/index.htm) includes a host name portion www.foundrynet.com that needs to be resolved into an IP address. The client first provides the host name portion to a local name resolver, which then queries a local Domain Name System (DNS) server to obtain a corresponding IP address. If a corresponding IP address is not locally cached at the time of the query, or if the time-to-live (TTL) of a corresponding IP address cached locally has expired, the DNS server then acts as a resolver and dispatches a recursive query to another DNS server. This process is repeated until an authoritative DNS server for the domain (e.g., foundrynet.com, in this example) is reached. The authoritative DNS server returns one or more IP addresses, each corresponding to an address at which a server hosting the application ("host server") under the host name can be reached. These IP addresses are propagated back via the local DNS server to the original resolver. The application at the client then uses one of the IP addresses to establish a TCP connection with the corresponding host server. Each DNS server caches the list of IP addresses received from the authoritative DNS server for responding to future queries regarding the same host name, until the TTL of the IP addresses expires.

To provide some load sharing among the host servers, global server load balancing (GSLB) switches are sometimes used as proxies for authoritative DNS servers, together with one or more site switches each associated with one or more host servers. Each site switch provides the GSLB switch with current site-specific information ("metrics") regarding access conditions to the host servers associated with the site switches. The GSLB switch then processes the addresses returned by the DNS server using the metrics compiled from the site switches and provides an ordered address list having the optimum address for access listed at the top. An example of a GSLB system and description of associated metrics are disclosed in U.S. application Ser. No. 10/376,903, entitled "GLOBAL SERVER LOAD BALANCING," filed Feb. 28, 2003, assigned to the same assignee as the present application, and which is incorporated herein by reference in its entirety.

A criterion that is sometimes used for load balancing purposes is geographic location. That is, where there are multiple geographically located servers, load balancing systems attempt to direct client requests to a server that is geographically the closest to the client. The geographic location of the client and the servers is determined using a static table containing Internet Assigned Numbers Authority (IANA)-allocated IP address prefixes and the associated geographic locations. However, such load balancing systems that are based on static mappings between the IP address prefixes and the geographic locations have drawbacks that lead to less-than-optimum performance.

For instance, load balancing systems generally maintain only a static table of some IANA-allocated IP address prefixes and the associated geographic designation. This table may be in the form of a database having IP address prefixes (e.g., IP address/prefix length) and the corresponding geographic locations (e.g., the country and region designation) for the respective IP address prefixes. There are several shortcomings to just having such a static geographic database.

First, a load balancing system maintains only some, and generally not all, of the IANA-allocated entries in its statically generated database. This is because IP address allocation by the IANA is an ongoing process, and so the load balancing software will have to be updated each time a new IP address and/or address prefix is allocated, in order to keep up with the latest IANA allocations. Since constant updating of the load balancing software and static geographic database is not practical, the load balancing system would be missing many IP address prefixes and associated geographic location information in its geographic database, and hence would not be able to determine the geographic location of many clients correctly.

Additionally, users (such as system administrators) generally cannot override the geographic region for a prefix. For instance, a prefix 149.204.0.0/16 may be specified as being in the geographic region EUROPE in a load balancing switch's internal static geographic prefix database. If the user has a client with an address of 149.204.11.1, which actually resides in ASIA, there is currently no suitable technique in which the user can override the geographic region for the prefix specified in the database. This means that the load balancing switch will always treat the client at 149.204.11.1 as being in the geographic region EUROPE, even though the user wants the prefix to be associated with ASIA.

BRIEF SUMMARY OF THE INVENTION

One aspect provides a method that includes storing first geographic settings associated with network addresses, including storing first address prefix information and corresponding first geographic region information. The method stores second geographic settings associated with network addresses, including storing second address prefix information and corresponding second geographic region information. The method overrides the first geographic settings with respective second geographic settings for network addresses that have first prefix information that matches the second prefix information, to associate these network addresses to the second geographic region information. Using at least the second geographic settings as a metric, the method load balances traffic, from a client having a network address associated with the second geographic information, to a domain represented by the network addresses associated with the second geographic information.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
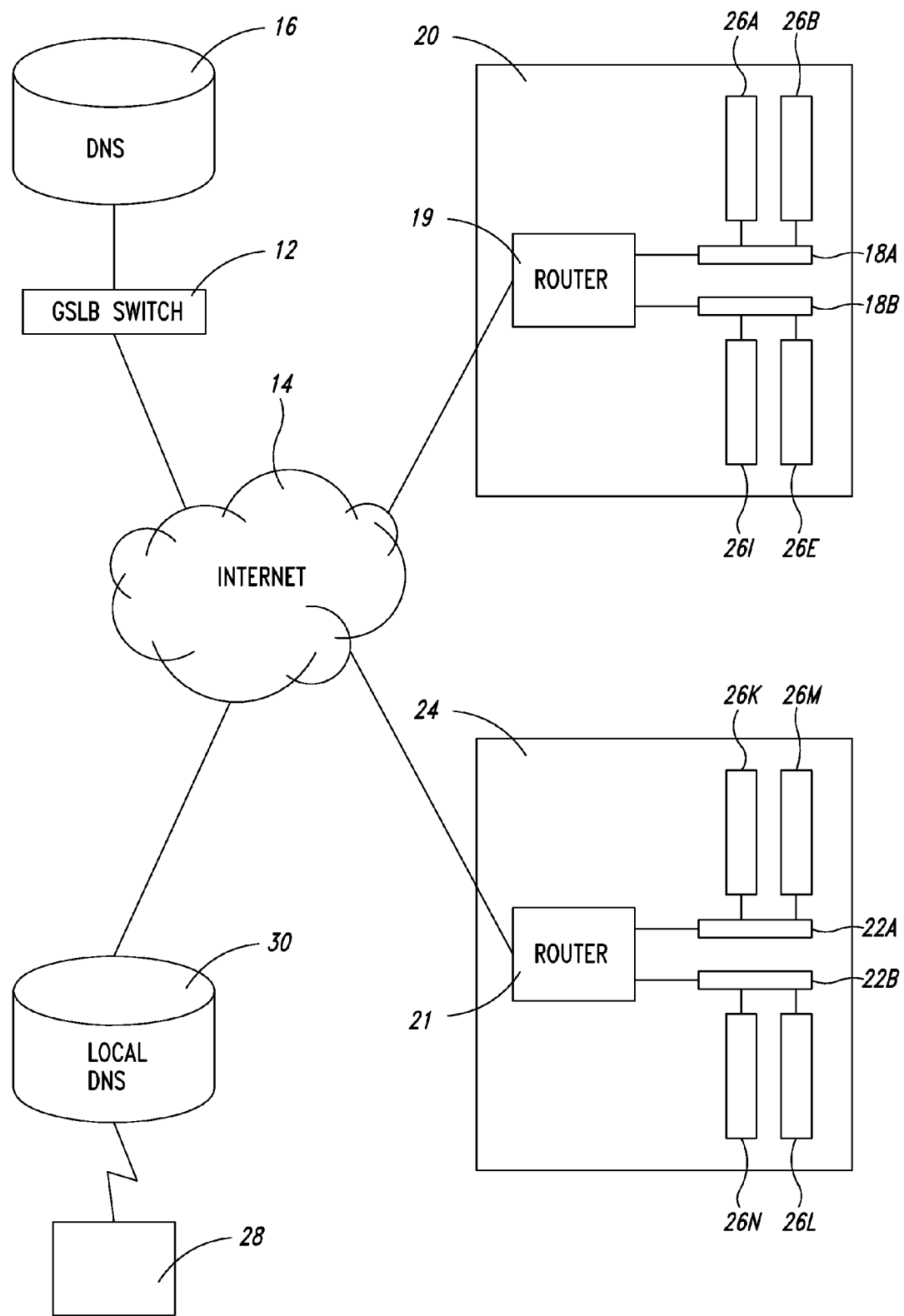
FIG. 1 illustrates a GSLB system in which an embodiment may be implemented.

Embodiments of techniques to provide configurable geographic prefixes for GSLB are described herein. In the following description, numerous specific details are given to provide a thorough understanding of embodiments. One skilled in the relevant art will recognize, however, that the invention can be practiced without one or more of the specific details, or with other methods, components, materials, etc. In other instances, well-known structures, materials, or operations are not shown or described in detail to avoid obscuring aspects.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment provides "user-configurable geographic prefixes" features that overcome the above-described shortcomings and provides several other advantages. With the user-configurable geographic prefix feature(s), the prefix (or other address portion) and the associated geographic region for that prefix can be specified. For instance, "region" could be defined based on a continent, country, state, city, or other user-defined area. In an embodiment, the user-configurable geographic prefixes can be implemented for a GSLB system, where a load balancing switch or other network device maintains a separate user-configured geographic prefix database to store the various entries. If a prefix also exists in a static internal geographic database maintained by the load balancing switch, then the user-configured entry will override it (e.g., if the prefix 200.0.0.0/8 is SOUTH AMERICA in the internal geographic database and if the user configures a geographic prefix 200.0.0.0/8 to be in the region NORTH AMERICA, then the user-configured entry will override the earlier entry, and any IP address that matches the prefix 200.0.0.0/8 will deemed to reside in NORTH AMERICA).

As described above, the user-configurable geographic prefix feature(s) can be implemented in a GSLB system. In the GSLB system, a set of metrics are used by the load balancing switch to evaluate IP addresses in the DNS replies from the DNS server for which the load balancing switch is providing GSLB. The load balancing switch may initially generate the static internal database of geographic prefixes using the IANA-allocated IP address prefixes and the associated geographic location information. These, static database entries (including any default static geographic region specifications) may be overridden with user-configured entries, as needed, in accordance with an embodiment. The geographic location of a server (e.g., a server that is geographically close to a client) can then be used as one of the metrics in the GSLB policy to determine the best IP address to receive a request from the client.

FIG. 1 illustrates one example global server load balancing system with which an embodiment may be implemented. As shown in FIG. 1, a GSLB switch 12 (i.e., a load balancing switch) is connected to an Internet 14 and acts as a proxy to an authoritative Domain Name System (DNS) server 16 for a domain "foundrynet.com" (for example). That is, while the authoritative DNS server 16 provides the actual DNS service, the IP address known to the rest of the Internet 14 for the authoritative DNS server 16 of the domain "foundrynet.com" is a virtual IP (VIP) address configured on the GSLB switch 12. Of course, authoritative DNS server 16 can also act simultaneously as an authoritative DNS for other domains. The GSLB switch 12 communicates, via the Internet 14, with site switches 18A and 18B at site 20, site switches 22A and 22B at site 24, and any other similarly configured site switches. The site switches 18A, 18B, 22A and 22B are shown, for example, connected to routers 19 and 21 respectively and to servers 26A, ..., 26I, ... 26N. Some or all of the servers 26A, ..., 26I, ..., 26N may host application server programs (e.g., http and ftp and others). These host servers are reached through the site switches 18A, 18B, 22A and 22B using one or more virtual IP addresses configured at the site switches, which act as proxies to the host servers.

A suitable switch for implementing either the GSLB switch 12 or any of the site switches 18A, 18B, 22A and 22B is the ServerIron® (SI) product available from Foundry Networks, Inc. of San Jose, Calif. Throughout this description and in the figures, the SI switch will be described as the network device that can provide and implement the various geographic features of an embodiment. It is understood that this use of the SI switch is merely for purposes of illustration and explanation. Any suitable non-SI switch or non-SI network device can be used to implement the various geographic features and functions described herein.

FIG. 1 also shows a client program 28 connected to the Internet 14, and that communicates with a local DNS server 30. When a browser on the client program 28 requests a web page, for example, using a Universal Resource Locator (URL), such as http://www.foundrynet.com/index.htm, a query is sent to the local DNS server 30 to resolve the symbolic host name www.foundrynet.com to an IP address of a host server. The client program 28 receives from the DNS server 30 a list of IP addresses corresponding to the resolved host name. This list of IP addresses is either retrieved from the local DNS server 30's cache, if the TTL of the responsive IP addresses in the cache has not expired, or obtained from the GSLB switch 12, as a result of a recursive query. Unlike the prior art, however, this list of IP addresses is ordered by the GSLB switch 12 based on performance metrics as described in further detail in U.S. application Ser. No. 09/670,487, entitled "GLOBAL SERVER LOAD BALANCING," filed Sep. 26, 2000; in U.S. application Ser. No. 10/206,580, entitled "GLOBAL SERVER LOAD BALANCING," filed Jul. 25, 2002 (disclosing embodiments of a connection-load metric for GSLB); in U.S. application Ser. No. 10/305,823, entitled "DISTRIBUTED HEALTH CHECK FOR GLOBAL SERVER LOAD BALANCING," filed Nov. 27, 2002 (disclosing embodiments for distributing health check tasks to peer metric agents); and in U.S. application Ser. No. 10/376,903, entitled "GLOBAL SERVER LOAD BALANCING," filed Feb. 28, 2003 (disclosing embodiments of weighted site, weighted IP, and active bindings metrics); all of which are assigned to the same assignee as the present application and incorporated herein by reference in their entireties. These are a few example applications where various GSLB performance metrics are described. For the sake of brevity, these various performance metrics and the manner in which they are used in a GSLB algorithm to identify best sites in a list of IP addresses are only summarized and not described in detail herein. Such additional details may be found in these co-pending applications and in the applications that they reference.

In the remainder of this detailed description, for the purpose of illustrating embodiments only and except where indicated, the list of IP addresses returned are assumed to be the virtual IP addresses configured on the proxy servers at switches 18A, 18B, 22A and 22B (sites 20 and 24). In one embodiment when the authoritative DNS server 16 resolves a host name in a query and returns one or more IP addresses, the GSLB switch 12 determines (using the performance metrics) which site switch would provide the best expected performance (e.g., response time) for the client program 28 and returns the IP address list with a virtual IP address configured at that site switch placed at the top. (Other forms of ranking or weighting the IP addresses in the list can also be possible.) The client program 28 can receive the ordered list of IP addresses, and typically selects the first IP address on the list to access the corresponding host server.

Figure 2:
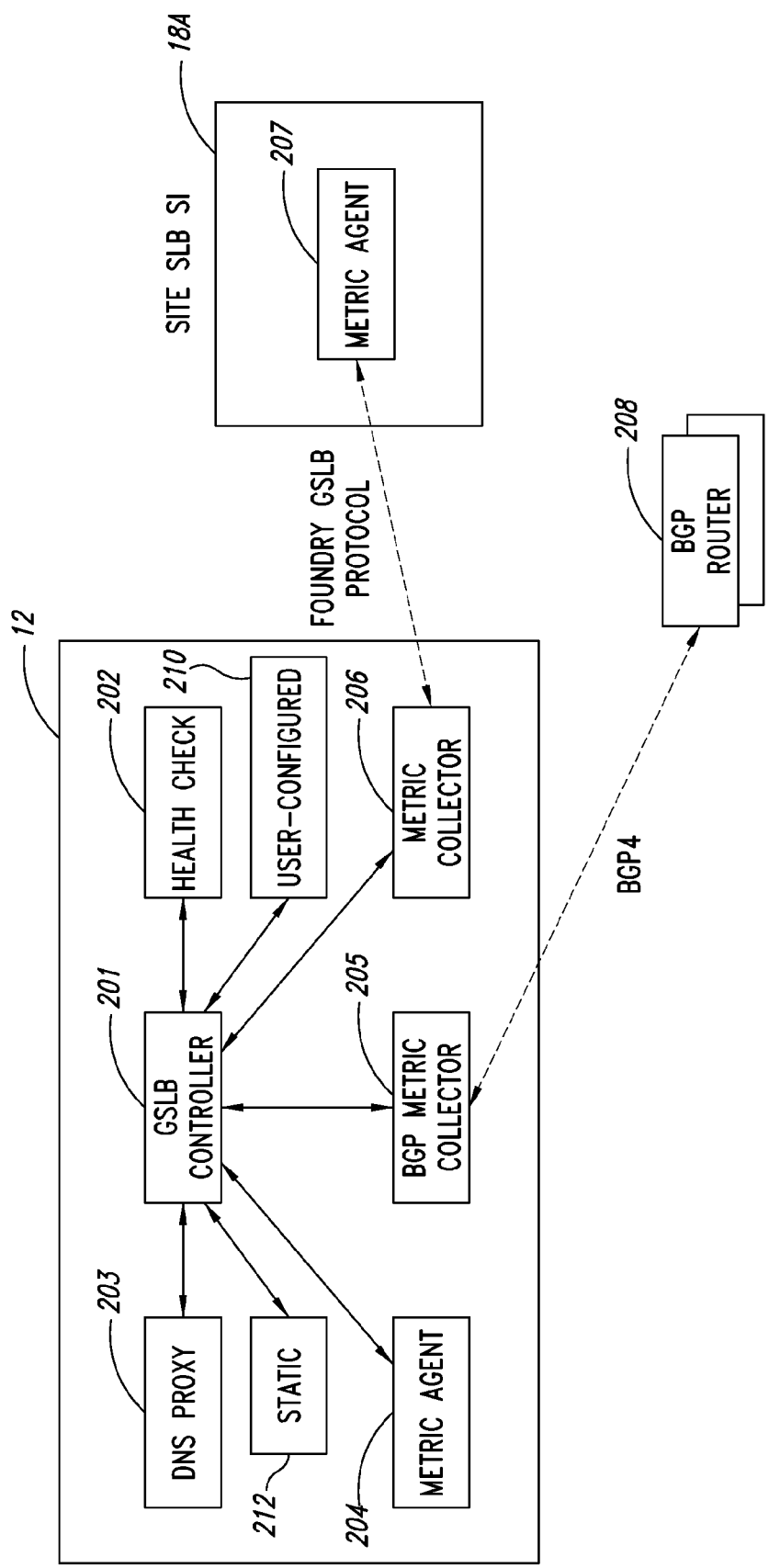
FIG. 2 illustrates a GSLB switch of FIG. 1 according to an embodiment.

FIG. 2 is a block diagram showing the functional modules of an embodiment of the GSLB switch 12 and site switch 18A (for instance) relevant to the global server load balancing function, including functions and features associated with geographic data. As shown in FIG. 2, the GSLB switch 12 includes a GSLB switch controller 201, health check module 202, DNS proxy module 203, metric agent 204, routing metric collector 205, and metric collector 206. The GSLB switch controller 201 provides general control functions for the operation of the GSLB switch 12. The health check module 202 is responsible for querying, either periodically or on demand, host servers and relevant applications hosted on the host servers to determine the "health" (e.g., whether or not it is available) of each host server and each relevant application. The metric collector 206 communicates with metric agents in site-specific switches (e.g., FIG. 2 shows the metric collector 206 communicating with a remote metric agent 207 of a site server load balancing ServerIron® or "SLB SI") to collect site-specific metrics (e.g., number of available sessions on a specific host server and/or connection-load data indicative of connections-per-second at that host server at the site 18A, or other metrics data).

The routing metric collector 205 collects routing information from routers (e.g., topological distances between nodes on the Internet). FIG. 2 shows, for example, a router 208 providing the routing metric collector 205 with routing metrics (e.g., topological distance between the load balancing switch and the router), using the Border Gateway Protocol (BGP). The DNS proxy module 203 (A) receives incoming DNS requests, (B) provides the host names to be resolved to the DNS server 16, (C) receives from the DNS server 16 a list of responsive IP addresses, (D) orders the IP addresses on the list received from the DNS server 16, using the metrics collected by the routing-metric collector 405 and the site specific collector 406, and values of any other relevant parameter (including geographic criteria), and (E) provides the ordered list of IP addresses to the requesting DNS server. Since the GSLB switch 12 can also act as a site switch, the GSLB switch 12 is provided with the metric agent 204 for collecting metrics for a metric collector.

In one embodiment, the GSLB switch controller 201 can be programmed with and/or can access data to be used for geographic metrics and also for at least one of weighted site, weighted IP, active bindings, or other metrics described in the co-pending applications identified above. For instance, the GSLB switch controller 201 can be communicatively coupled to a first storage unit 212 that contains IANA-allocated geographic prefixes and the associated geographic designation, or default geographic-related settings. The GSLB switch controller 201 can also be communicatively coupled to a second storage unit 210 that contains user-configured geographic settings. In an embodiment, the first storage unit 212 and the second storage unit 210 can be in the form of databases having tables. It is appreciated, however, that either or both of these storage units can be embodied by any suitable data structure (including file systems, directory structures, variables, static or dynamic code, and so forth). Additionally, the first and second storage units need not necessarily be separate, and may be integrated in whole or in part into a single storage unit, for instance.

Figure 3:
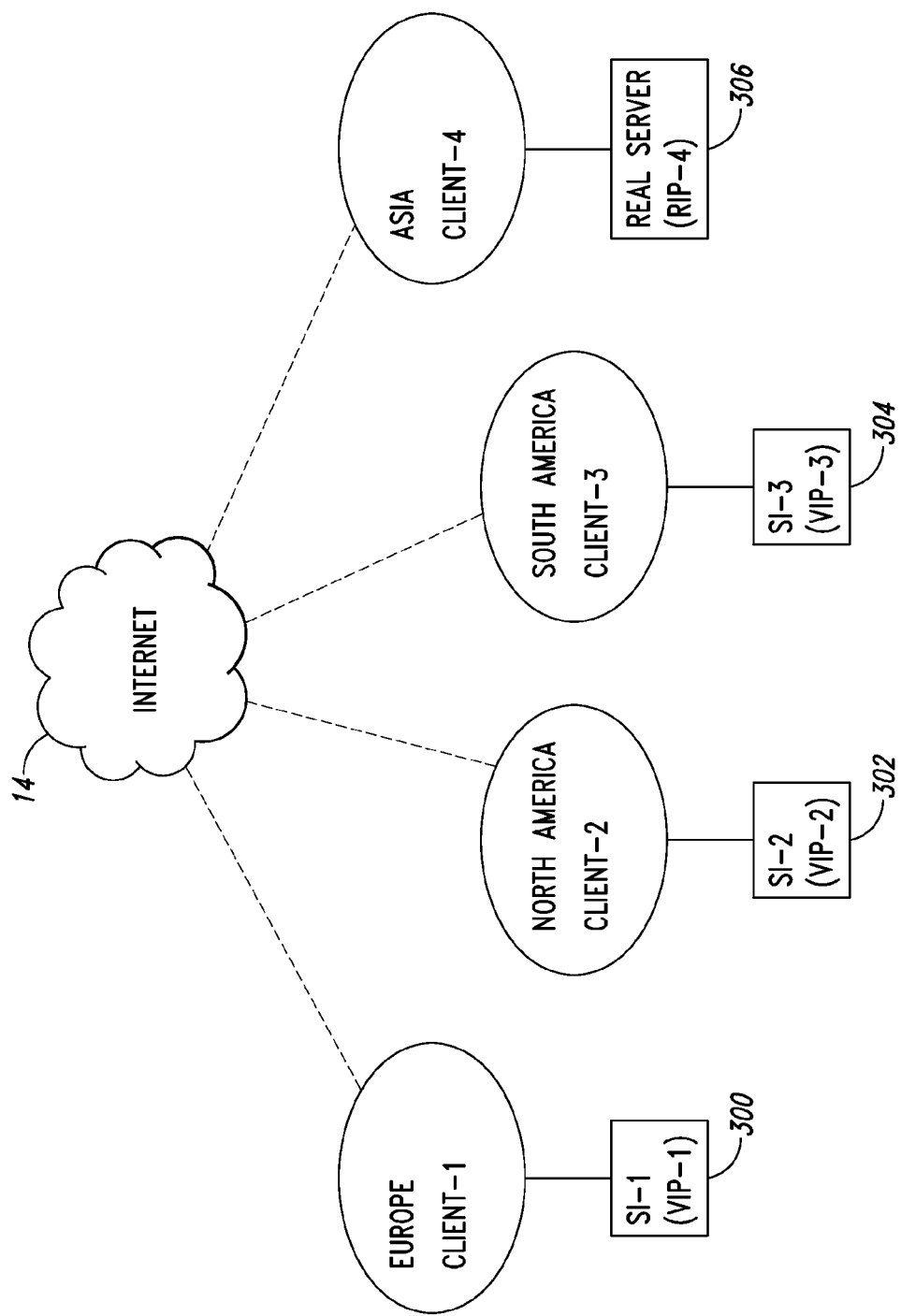
FIG. 3 illustrates an example application of geographic criteria for GSLB according to an embodiment.

FIG. 3 illustrates an example application of geographic criteria for GSLB according to an embodiment. As described above, one of the metrics that can be used by an embodiment of the GSLB switch 12 to select the best IP address for clients is the geographic metric. This metric enables the GSLB switch controller 201 to direct a client to a server that is geographically the closest to that client. In the example illustrated in FIG. 3: The GSLB switch 12 (not shown) provides GSLB for the domain www.foo.com. There are four IP addresses configured for www.foo.com: VIP-1, VIP-2, VIP-3, and RIP-4. VIP-1 is a virtual server IP address on a site switch 300 (SI-1) that resides in EUROPE. VIP-2 is a virtual server IP address on a site switch 302 (SI-2) that resides in NORTH AMERICA, VIP-3 is a virtual server IP address on a site switch 304 (SI-3) that resides in SOUTH AMERICA, and RIP-4 is a real server 306's IP address that resides in ASIA. As indicated in the example of FIG. 3, Client-1 resides in the continent of EUROPE; Client-2 is in NORTH AMERICA, Client-3 is in SOUTH AMERICA, and Client-4 is in ASIA.

When the geographic metric is used by the GSLB switch 12 to select the best IP address for the client then:
    a> If Client-1 makes a request for www.foo.com, the GSLB switch 12 will select VIP-1 as the best IP address for Client-1 since VIP-1 is the closest geographically to Client-1 (e.g., both are in EUROPE);

b> If Client-2 makes a request for www.foo.com, the GSLB switch 12 will select VIP-2 as the best IP address for Client-2 since VIP-2 is the closest geographically to Client-2 (e.g., both are in NORTH AMERICA);

c> If Client-3 makes a request for www.foo.com, the GSLB switch 12 will select VIP-3 as the best IP address for Client-3 since VIP-3 is the closest geographically to Client-3 (e.g., both are in SOUTH AMERICA); and d> If Client-4 makes a request for www.foo.com, the GSLB switch 12 will select RIP-4 as the best IP address for Client-4 since RIP-4 is the closest geographically to Client-4 (e.g., both are in ASIA).

Thus, the GSLB switch 12 of an embodiment uses the geographic metric to select the IP address that is geographically the closest to the querying client. Geographical "closeness" can be specified in multiple non-exhaustive ways. The user can specify the following, for example:

a> A client and server are to be considered geographically close if they lie in the same continent.

b> A client and server are considered to be geographically close if they lie in the same country.

c> A client and server are considered to be geographically close if they reside in the same state, city, district, etc.

d> The user can also define a fictional area and define any entity residing in that area as geographically "close."

In an embodiment, the GSLB switch 12 deduces the geographic region of a client or server based on its IP address. The IANA assigns the IP addresses, and the GSLB switch 12 generates the static table (e.g., in the first storage unit 212) of the mappings between an IP address prefix and the corresponding geographic location. Either or both the IANA allocations or other geographic settings (including user-configured settings) may be used to deduce the geographic region of a client or server.

As an example, in the statically generated table in the first storage unit 212, the geographic region for the prefix 149.204.0.0/16 is EUROPE. Therefore, if Client-1 has an IP address 149.204.10.1, then the GSLB switch 12 refers to this static table and determines that Client-1 is in the region EUROPE. The GSLB switch 12 determines the geographic location of a real server 306 similarly based on the IP address. The GSLB switch 12 determines the geographic location of a VIP based on the management IP address of the site switch (e.g., the site switches 18A, 18B, 22A, 22B, 300-304, etc.) on which this VIP is configured. Thus, if the site switch 300 has an IP address of 149.204.53.1, then the GSLB switch 12 determines that the site switch 300 is in the region EUROPE. Therefore, VIP-1, which is configured on the site switch 300, will be deemed to be in the region EUROPE.

As additional examples and details, an embodiment of the GSLB switch 12 determines the geographic region of a server IP address in its DNS database (not shown) in the following ways:

For real IP addresses (as opposed to VIP addresses, which are logical IP addresses configured on the site switches), the geographic region is based on the IP address itself. If the user has configured a geographic prefix that matches the real server IP address, then the geographic location of the real server (e.g., the real server 306) will be obtained from the user-configured geographic prefix entry provided in the second storage unit 210.

For VIP addresses, the geographic region is based on the management IP address of the site switch on which the VIP is configured. If the user has configured a geographic prefix that matches the management IP address of the site switch on which the VIP is configured, then the geographic location of the VIP will be obtained from the user-configured geographic prefix entry provided in the second storage unit 210.

The user can further explicitly specify the region for a GSLB site if the management IP address of the site switch at that site is not indicative of the geographic location. For example, if the management IP address is in a private sub-net, the address does not indicate that site switch's geographic location. If the user specifies the region for the GLSB site at which the site switch resides in the second storage unit 210, the GSLB switch 12 uses the user-specified region instead of the region of the site switch's management IP address. If the user has configured a geographic prefix entry that matches the management IP address of the site switch and has also specified a geographic location for the GSLB site where that site switch resides, then the geographic location configured for the GSLB site will take precedence over that defined in the user-configured geographic prefix entry (i.e., the geographic region for a VIP configured on the remote site switch will be obtained from the geographic location configured for the GSLB site where the remote site switch resides instead of the geographic prefix entry that matches the management IP address of that remote site switch).

An embodiment of the GSLB switch 12 determines the geographic location of the client as follows:

For each client query, the GSLB switch 12 can determine the geographic location from which the client query came based on the client's IP address (or other address of a client terminal on which the client program 28 resides). If the IP address prefix of a user-configured geographic prefix entry in the second storage unit 210 matches that of the client, then the geographic location of the client will be determined from that user-configured geographic prefix entry.

If multiple server IP addresses compare equally based on at least some of the GSLB metrics in the GSLB policy, then the GSLB switch 12 uses the geographic metric to select the server IP addresses within the same geographic region as the client query. The flowcharts of FIGS. 4-6 illustrate implementation of these concepts in further detail.

Figure 4:
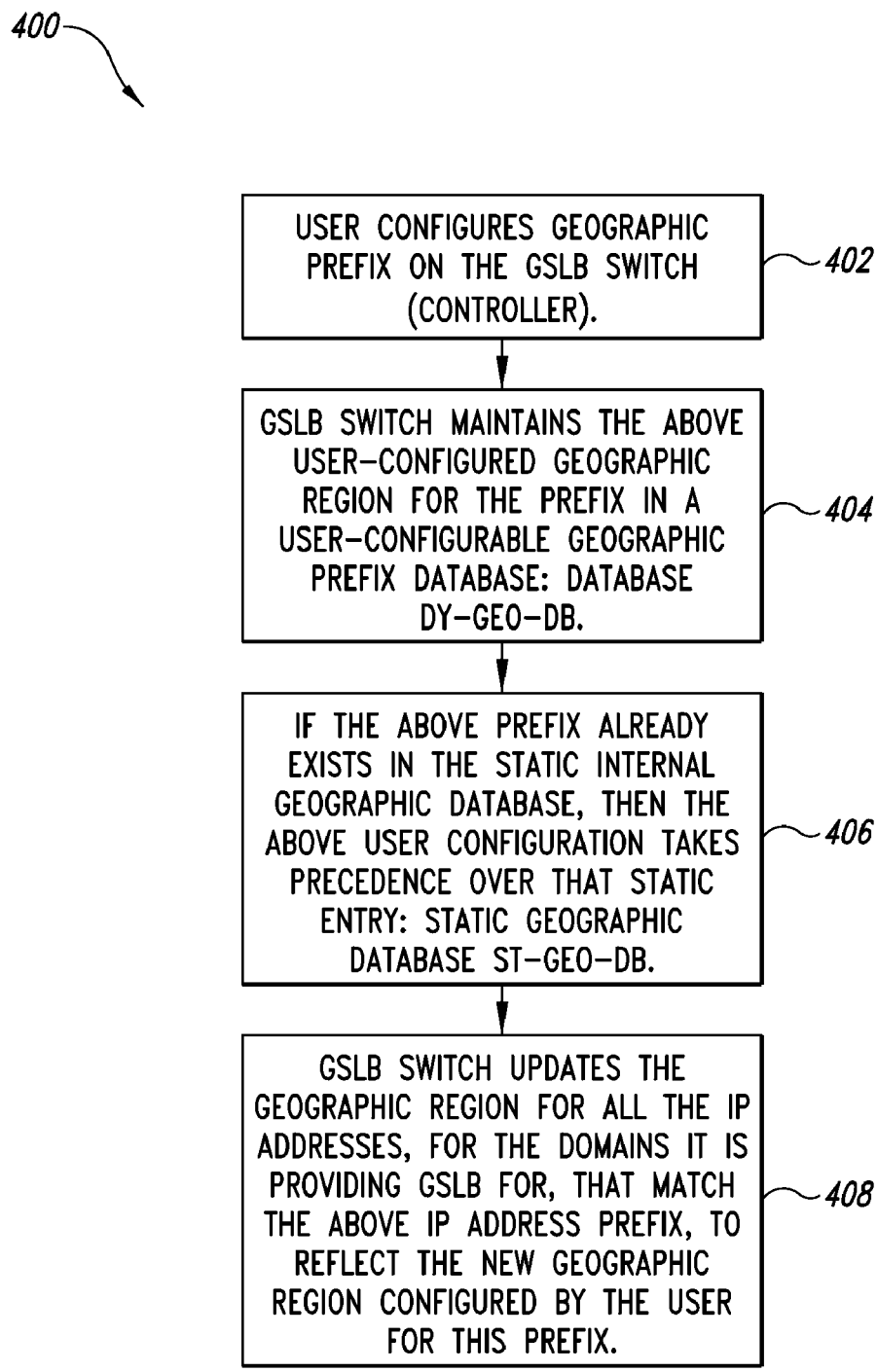
FIG. 4 is a flowchart that depicts configuration of geographic prefix data according to an embodiment.
Figure 5:
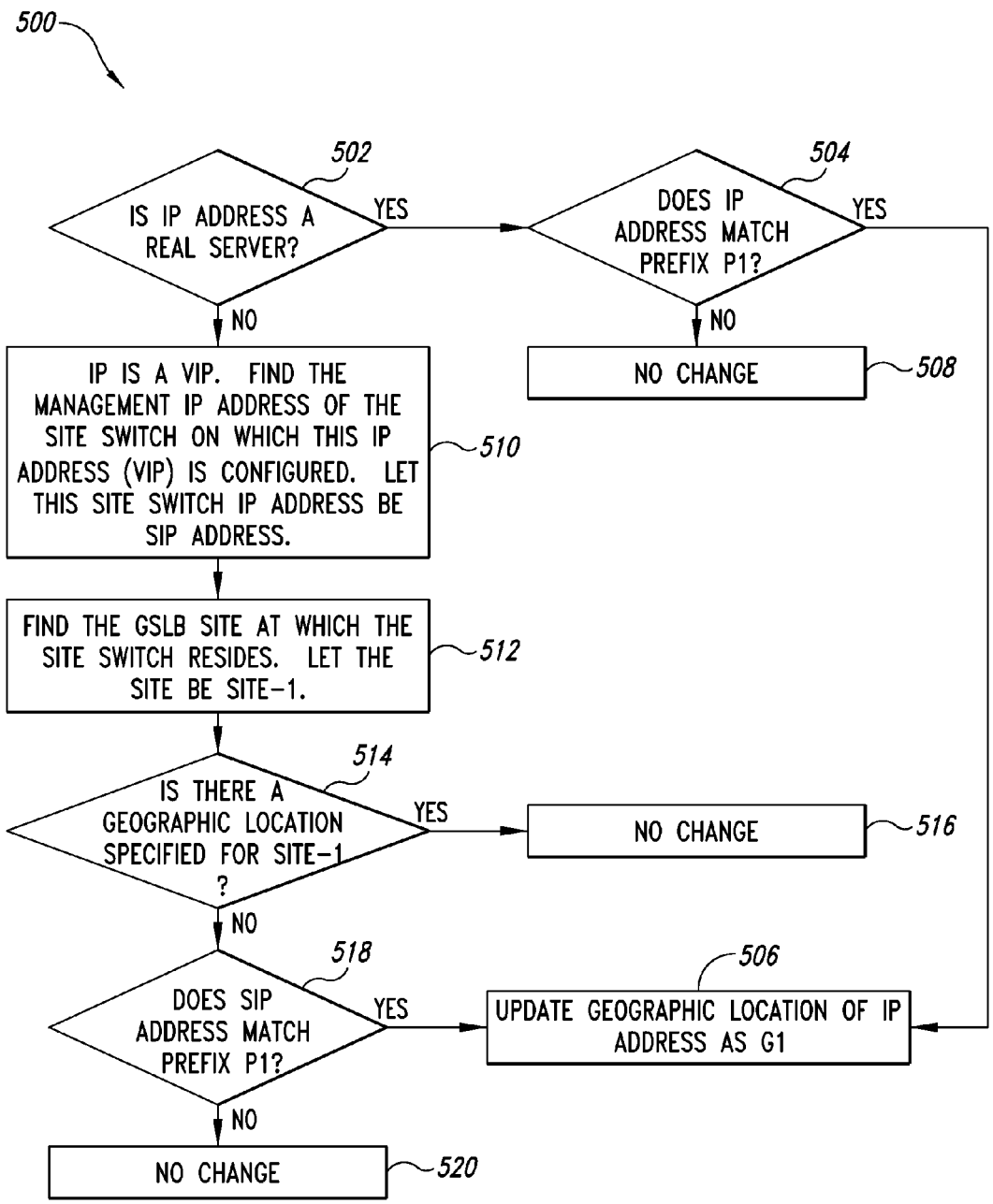
FIG. 5 is a flowchart that depicts updating of geographic regions of domain IP addresses with user-configured geographic prefixes according to an embodiment.

In the flowcharts of FIGS. 4-6, certain operations are depicted. At least some of these operations can be embodied in software or other machine-readable instruction stored on a machine-readable medium. For example, some of the features of the flowcharts can be present as code in the first storage unit 212, in the second storage unit 210, or in some other storage unit of the GSLB switch 12, and executable by the GSLB switch controller 201 or other processor of the GSLB switch 12. Moreover, it is appreciated that the operations need not necessarily occur in the exact order shown. Also, operations may be added, removed, combined, or modified in various embodiments.

FIG. 4 is a flowchart 400 illustrating configuration of geographic prefix data according to an embodiment. At a block 402, the user (such as a system administrator) configures the geographic prefix(es) on the GSLB switch controller 201 of the GSLB switch 12. For example, the user may set the geographic region for the prefix 149.204.0.0/16 as EUROPE.

At a block 404, the GSLB switch 12 maintains the user-configured geographic region for the prefix in a user-configurable geographic prefix database (referred to in the flowcharts as the database "DY-GEO-DB"). The DY-GEO-DB database contains the information that can be dynamically provided or changed by the user, and is maintained in the second storage unit 210 in one embodiment.

At a block 406, if the above prefix already exists in the static internal geographic database (referred to in the flowcharts as the database "ST-GEO-DB") maintained in the first storage unit 212, then the above user configuration takes precedence over that static entry. At a block 408, the GSLB switch 12 updates the geographic region for all the IP addresses (for the domains for which the GSLB switch 12 is providing GSLB) that match the above IP address prefix, so as to reflect the new geographic region configured by the user for this prefix. The operations at the block 408 are shown in further detail in FIG. 5.

FIG. 5 is a flowchart 500 that depicts the updating of the geographic region of domain IP addresses with the user-configured geographic prefix according to an embodiment. When the user configures a geographic prefix at the block 402 of FIG. 4, then the GSLB switch 12 updates the geographic prefix for each IP address in the domain for which the GSLB switch 12 is providing GSLB.

As an example, the user configures a prefix P1 to be in a geographic region G1. Then, for each of the IP addresses in the domains for which the GSLB switch 12 is providing GSLB, the GSLB switch 12 (or more specifically the GSLB switch controller 201 in an embodiment) determines at a block 502 whether the IP address corresponds to a real server. If the IP address corresponds to a real server, then the GSLB switch 12 determines at a block 504 whether the IP address matches the prefix P1. If there is a match, then the GSLB switch 12 updates the geographic location of that IP address as the geographic region G1 at a block 506. If there is no match at the block 504, then no updates are made to the geographic location of this IP address (as depicted at a block 508).

Back at the block 502, if the IP address is determined by the GSLB switch 12 as not corresponding to a real server, then the IP address is deemed to be a VIP address at a block 510. The GSLB switch 12 then finds the management IP address of the site switch on which this VIP is configured. The IP address of the site switch may be found in a table or other address records maintained by or accessible to the GSLB switch 12. The IP address of this site switch is referred to as "SIP" address in FIG. 5.

At a block 514, the GSLB switch 12 finds the GSLB site at which the site switch resides. This GSLB site is referred to as "Site-1" in FIG. 5. The GSLB switch 12 determines at a block 514 whether there is a geographic location specified for Site-1. If there is a geographic location specified, then no change is made to that geographic location (as depicted at a block 516). Else if there is no geographic location specified for Site-1, then the flowchart 500 proceeds to a block 518.

At the block 518, the GSLB switch 12 determines whether the SIP address matches the prefix P1. If there is a match, then the GSLB switch 12 updates the geographic location of that VIP address as the geographic region G1 at the block 506. Else if there is no match at the block 518, then no updates are made to the geographic location of the VIP address (as indicated at a block 520).

Figure 6A:
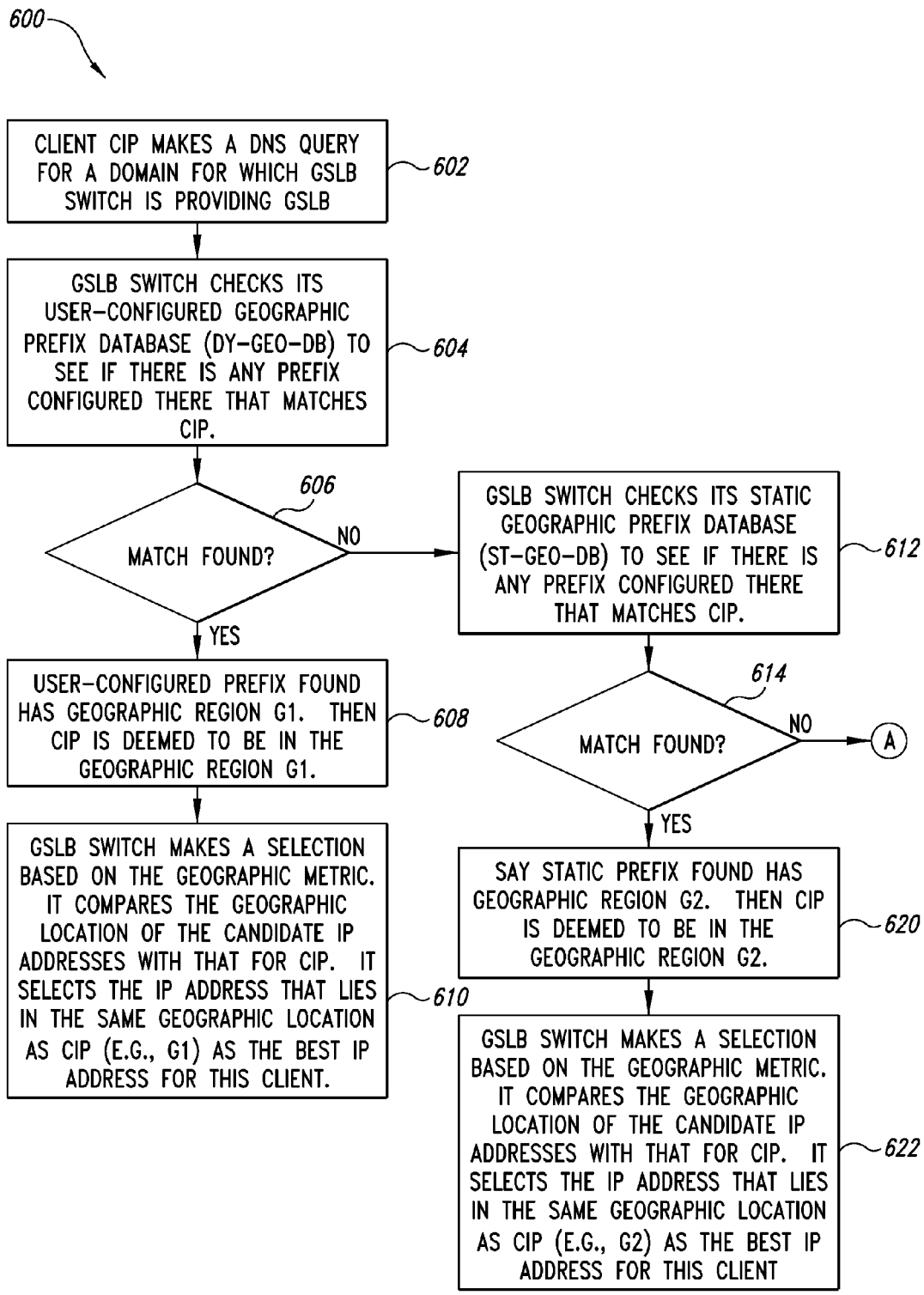
FIGS. 6A-6B show a flowchart that depicts operation of the GSLB system of FIG. 1 to use geographic settings to perform load balancing according to an embodiment.
Figure 6B:
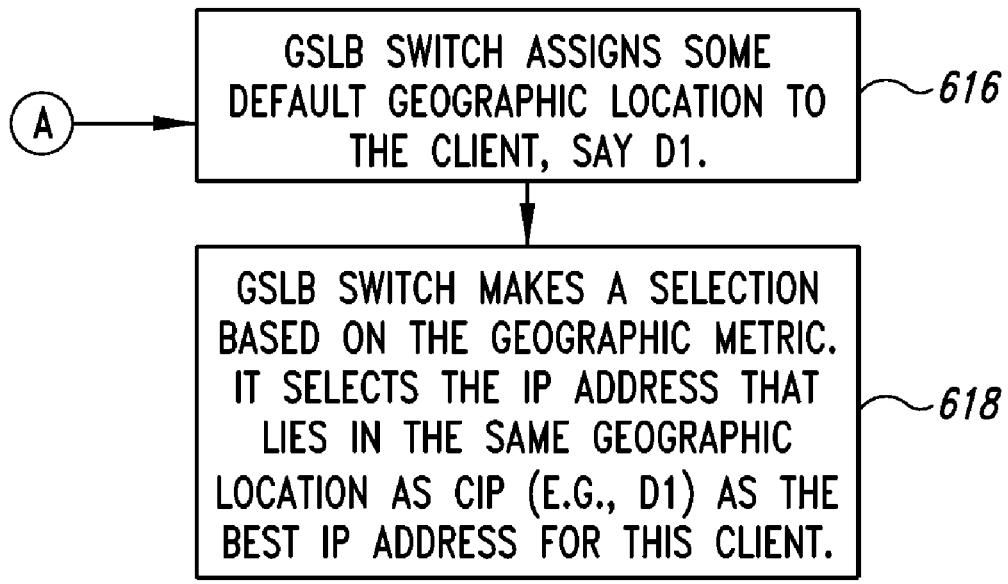

FIGS. 6A-6B show a flowchart 600 that depicts operation of the GSLB system of FIG. 1 to use geographic settings, including user-configured settings, to perform load balancing according to an embodiment. At a block 602, the client program 28, located at a client IP address (CIP), makes a DNS query for a domain for which the GSLB switch 12 is providing GSLB.

At a block 604, the GSLB switch 12 checks its user-configured geographic prefix database (e.g., the DY-GEO-DB database) to determine if there is any prefix configured therein that matches the CIP. If a match is found at a block 606 and the user-configured prefix has a geographic region G1, then the CIP is deemed to be in the geographic region G1 at a block 608.

At a block 610, the GSLB switch 12 makes a selection of the best IP address to provide to the client program 28 based at least in part on the geographic metric. That is, the GSLB switch 12 of one embodiment compares the geographic location of the candidate IP addresses with that for CIP, and selects the candidate IP address that lies in the same geographic location as CIP (i.e., the region G1) as the best IP address for this client.

Back at the block 606, if no match is found between the CIP and the prefixes in the user-configured geographic prefix database, then the GSLB switch 12 checks the static geographic prefix database (e.g., ST-GEO-DB database) at a block 612 to determine if there is any prefix configured therein that matches the CIP. If no match is found at a block 614, then the GSLB switch 12 assigns some default geographic location to the client, for example the region D1, at a block 616. The GSLB switch 12 makes a selection based on the geographic metric at a block 618. The GSLB switch 12 selects the IP address that lies in the same geographic location as the CIP (e.g., the region D1 in this example) as the best IP address for this client.

Back at the block 614, if a prefix configured in the ST-GEO-DB database matches the CIP and the static prefix that is found has a geographic region G2 (for instance), then the CIP is deemed to be in the geographic region G2 at a block 620. The GSLB switch 12 makes a selection of the best IP address to provide to the client program 28 based at least in part on the geographic metric at a block 622. The GSLB switch 12 compares the geographic location of the candidate IP addresses with that for the CIP, and selects the candidate IP address that lies in the same geographic location as the CIP (e.g., the region G2) as the best IP address for this client.

An example can assist in further illustrating the operations depicted in the previous figures. Consider an example where the GSLB switch 12 is providing GSLB for the domain www.gslb1.com. The IP addresses for the domain www.gslb1.com are as follows:

10.10.10.200—This is a real server IP address; and 151.3.1.76—This is a VIP on a site switch having a management IP address of 151.3.1.102.

Initially, the user-configured geographic database (e.g., the DY-GEO-DB database in the second storage unit 210) is empty, as the user has not yet configured any geographic prefixes. Assume that there is an entry for the prefix 151.3.0.0/16 in the static geographic database (e.g., the ST-GEO-DB database in the first storage unit 212) where the geographic region for the prefix is specified as EUROPE. This means that the geographic location for 151.3.1.76 is EUROPE. Assume also that there is no entry in the static geographic database that matches the IP address 10.10.10.200; hence this IP address is assigned a default geographic location of NORTH AMERICA.

Now, the user wants the prefix 151.3.0.0/16 to be associated with ASIA instead of EUROPE. So, the user configures the geographic prefix 151.3.0.0/16 with a geographic region ASIA. This ASIA setting gets stored in the user-configured geographic prefix database, and will override the original EUROPE setting.

Once the user configures a geographic location for a prefix, the geographic location for the IP addresses in the GSLB domain gets updated as explained with respect to the flowchart 500 of FIG. 5. The new geographic locations of the IP addresses are as follows:

10.10.10.200—NORTH AMERICA (unchanged as this IP address does not match a user-configured prefix); and 151.3.1.76—ASIA.

Now, the user also wants a prefix 175.6.0.0/16 to be associated with ASIA. So, the user configures the geographic prefix 175.6.0.0/16 with a geographic region ASIA. This information also gets stored in the user-configured geographic prefix database. The GSLB switch 12 does not update the geographic location for any IP addresses in the domain www.gslb1.com, since the prefix 175.6.0.0/16 does not match any IP address.

If a client at the IP address 175.6.10.1 makes a query to access the domain www.gslb1.com, the GSLB switch 12 refers to the user-configured geographic prefix database and determines the geographic location of the client to be ASIA. The GSLB switch 12 then selects 151.3.1.76 as the best IP address for the client since they both lie in the same geographic region of ASIA.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The above description of illustrated embodiments, including what is described in the Abstract, is not intended to be exhaustive or to limit the invention to the precise forms disclosed. While specific embodiments and examples are described herein for illustrative purposes, various equivalent modifications are possible within the scope of the invention and can be made without deviating from the spirit and scope of the invention.

For example, various embodiments have been described above in terms of IP addresses. It is appreciated that other embodiments for providing configurable geographic settings can be implemented for systems that use an addressing scheme that is not necessarily IP-address based.

These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
a network device configurable to, for a network address that has a particular address prefix that matches a stored address prefix corresponding to a geographic region, associate said network address to said geographic region, said geographic region being different from an original geographic region that corresponds to the particular address prefix,
wherein said network device is configurable as a proxy to an authoritative domain name system (DNS) server.

2. The apparatus of claim 1 wherein said particular address prefix includes an Internet Assigned Numbers Authority (IANA)-allocated IP address prefix, and wherein said original geographic region that corresponds to the particular address prefix includes an IANA-designated geographic region.

3. The apparatus of claim 1 wherein said network device includes a switch.

4. The apparatus of claim 1 wherein said network device includes a storage unit to store said stored address prefix.

5. The apparatus of claim 1 wherein to said associate said network address to said geographic region, said network device is configurable to override said original geographic region with said different geographic region.

6. A method, comprising:
configuring a network device as a proxy to an authoritative domain name system (DNS) server;
storing, in said network device, an address prefix that corresponds to a geographic region; and
for a network address that has a particular address prefix that matches the stored address prefix, associating said network address to said geographic region so as to override an original geographic region that corresponds to the particular address prefix.

7. The method of claim 6 wherein said particular address prefix includes an Internet Assigned Numbers Authority (IANA)-allocated IP address prefix, and wherein said original geographic region that corresponds to the particular address prefix includes an IANA-designated geographic region.

8. The method of claim 7 wherein said original geographic region that includes said IANA-designated geographic region includes a first continent, and
wherein to said override said original geographic region, said associating includes overriding said first continent with a second continent included in said geographic region corresponding to said stored address prefix.

9. An article of manufacture, comprising:
a machine-readable storage medium having machine-readable instructions stored thereon and executable by a processor of a network device configurable as a proxy to an authoritative domain name system (DNS) server, to:
for a network address that has a particular address prefix that matches a stored address prefix corresponding to a geographic region, associate said network address to said geographic region so as to override an original geographic region that corresponds to the particular address prefix.

10. The article of manufacture of claim 9 wherein said particular address prefix includes an Internet Assigned Numbers Authority (IANA)-allocated IP address prefix, and wherein said original geographic region that corresponds to the particular address prefix includes an IANA-designated geographic region.

11. The article of manufacture of claim 9 wherein machine-readable medium further has machine-readable instructions stored thereon and executable by said processor to:
for a request from a client to access a resource, load balance access to the resource by directing said request to a site switch located in said geographic region that has overridden the original geographic region,
wherein said geographic region is geographically closer to said client than said original geographic region.

12. A method, comprising:
storing, in a network device, a first geographic region that designates a location of a client device with a network address having a first address prefix;
in response to a second address prefix matching the first address prefix, overriding by the network device the stored first geographic region with a second geographic region to change the designated location of the client device from the first geographic region to the second geographic region,
wherein the second geographic region is different from the first geographic region.

13. The method of claim 12 wherein the first geographic region includes an IANA-designated geographic region.

14. The method of claim 12 wherein the network device is configurable as a proxy to an authoritative domain name system (DNS) server.

15. The method of claim 12, further comprising load balancing, by the network device, a request from the client by directing the request from the client to a server that is in or geographically close to the second geographic region.

* * * * *